(12) United States Patent
Nuno et al.

(10) Patent No.: US 7,261,307 B2
(45) Date of Patent: Aug. 28, 2007

(54) SUSPENSION ARM

(75) Inventors: Kazunobu Nuno, Himi (JP); Kazunari Azuchi, Himi (JP); Kiyohito Gyobu, Imizu (JP); Hitoshi Sakuma, Toyota (JP)

(73) Assignees: Aisin Keikinzoku Co., Ltd. (JP); Toyota Jidosha Kabushikikaisya (JP)

( * ) Notice: Subject to any disclaimer, the term of this patent is extended or adjusted under 35 U.S.C. 154(b) by 0 days.

(21) Appl. No.: 11/324,788

(22) Filed: Jan. 3, 2006

(65) Prior Publication Data

US 2006/0175788 A1 Aug. 10, 2006

Related U.S. Application Data

(63) Continuation of application No. PCT/JP2004/002662, filed on Mar. 3, 2004.

(30) Foreign Application Priority Data

Jul. 3, 2003 (JP) ............................. 2003-191526
Aug. 25, 2003 (JP) ............................. 2003-208732

(51) Int. Cl.
*B60G 3/02* (2006.01)

(52) U.S. Cl. ........................ 280/124.151; 280/124.1; 280/124.134; 280/124.145; 29/897.2

(58) Field of Classification Search ............ 280/124.1, 280/124.108, 124.116, 124.128, 124.13, 124.131, 280/124.132, 124.151, 124.134, 124.135, 280/124.141, 124.153, 124.142, 124.145; 29/987.2, 897.2

See application file for complete search history.

(56) References Cited

U.S. PATENT DOCUMENTS 5,169,055 A * 12/1992 Peterson et al. ............ 228/170
5,992,867 A * 11/1999 Kato et al. ............ 280/124.134
6,070,445 A    6/2000 Holierhoek
6,179,309 B1 * 1/2001 Satou et al. ........... 280/124.155
2004/0217570 A1 * 11/2004 Weshendorff ........ 280/124.109

FOREIGN PATENT DOCUMENTS

| EP | 0 913 277 | 5/1999 |
|---|---|---|
| EP | 1 364 817 | 11/2003 |
| JP | 11-239838 | 9/1999 |
| JP | 2000-225821 | 8/2000 |
| JP | 2000-35029 | 4/2001 |
| JP | 2001-097014 | 4/2001 |
| JP | WO01/32979 | 5/2001 |
| JP | 2002-274133 | 9/2002 |
| JP | 2002-316228 | 10/2002 |
| WO | WO 01/32979 | 5/2001 |

OTHER PUBLICATIONS

International Search Report dated May 6, 2004.
Supplementary European Search Report.

* cited by examiner

*Primary Examiner*—Paul N. Dickson
*Assistant Examiner*—Tiffany L. Webb
(74) *Attorney, Agent, or Firm*—Harness, Dickey & Pierce P.L.C.

(57) ABSTRACT

A suspension arm made of an aluminum alloy extruded profile having a portion forming a bottom portion, portions forming at least two vertical walls, and a horizontal rib which connects the two vertical walls, wherein a suspension part lower end support portion is formed between the two vertical walls or at the bottom portion by removing a part of the horizontal rib. It is preferable to gradually change the interval between the two vertical walls in the portion in which the horizontal rib is removed.

6 Claims, 25 Drawing Sheets

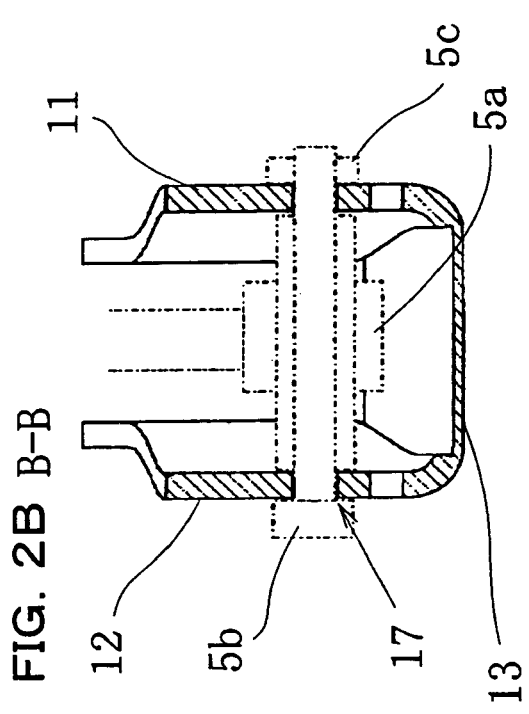
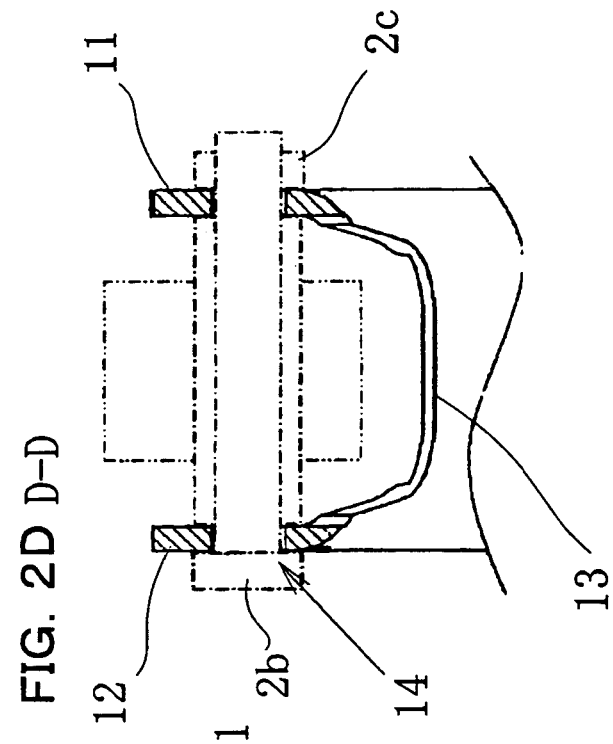
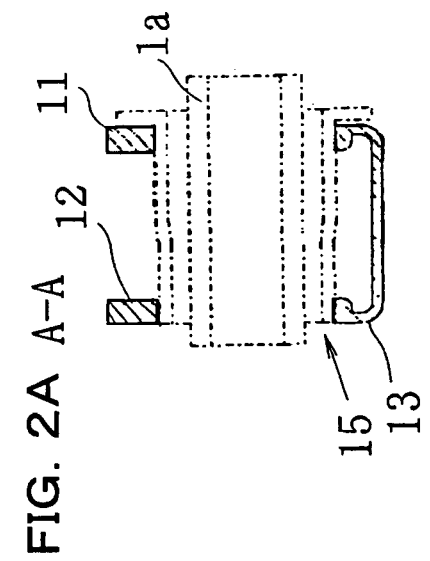
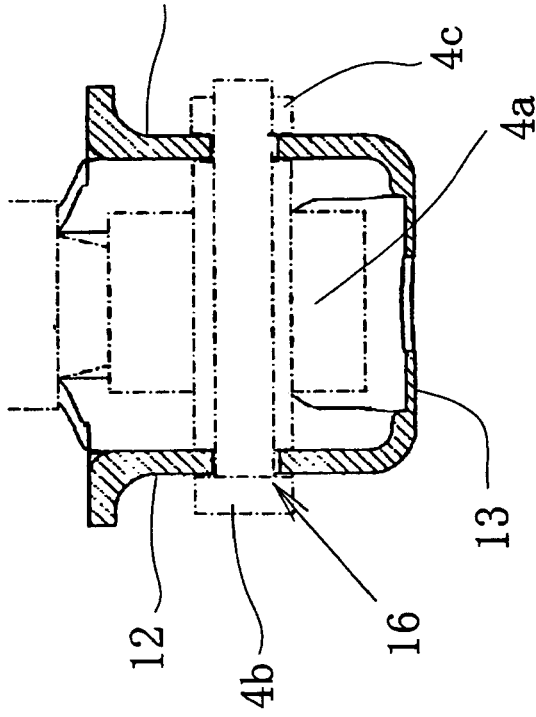

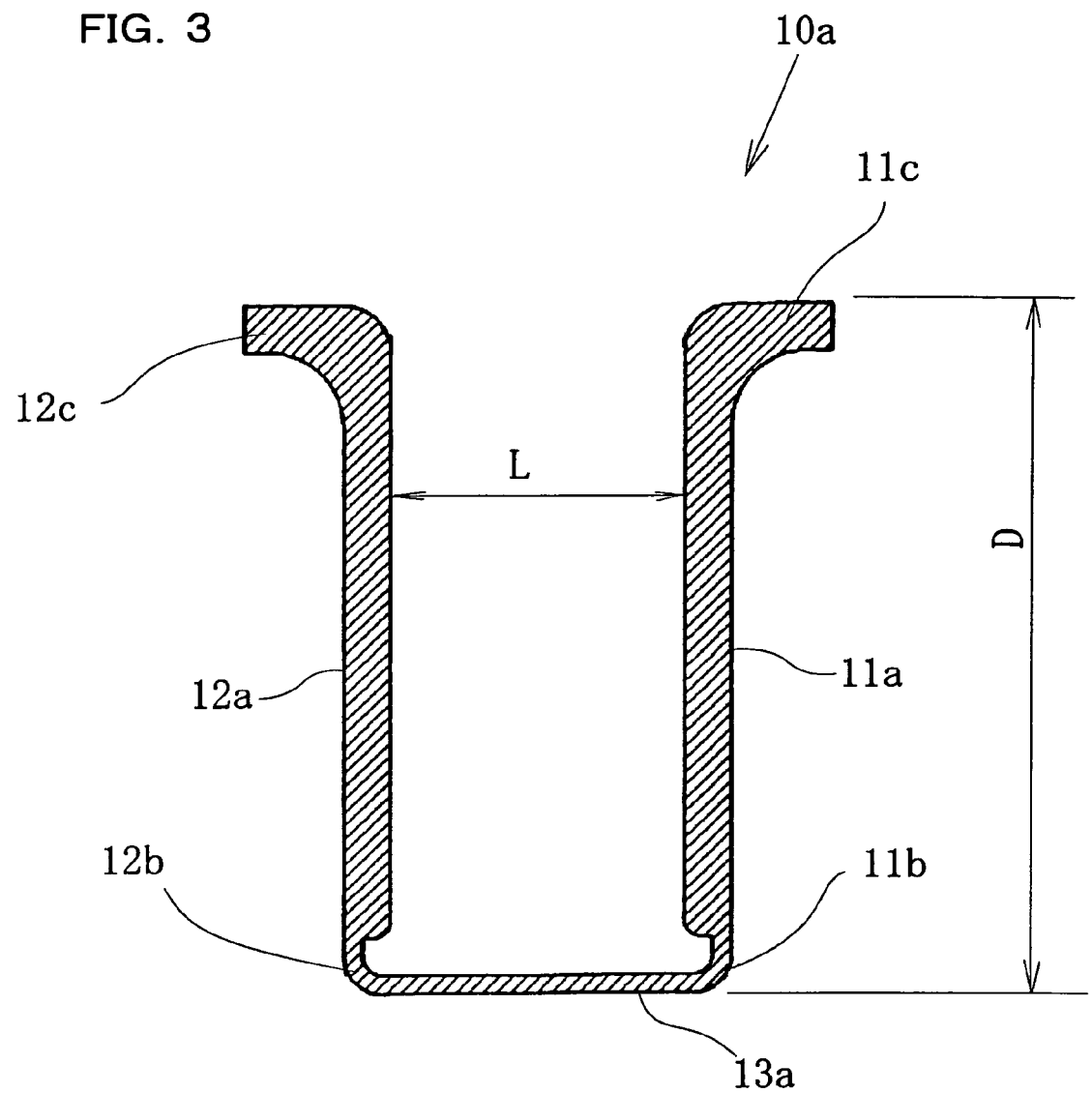

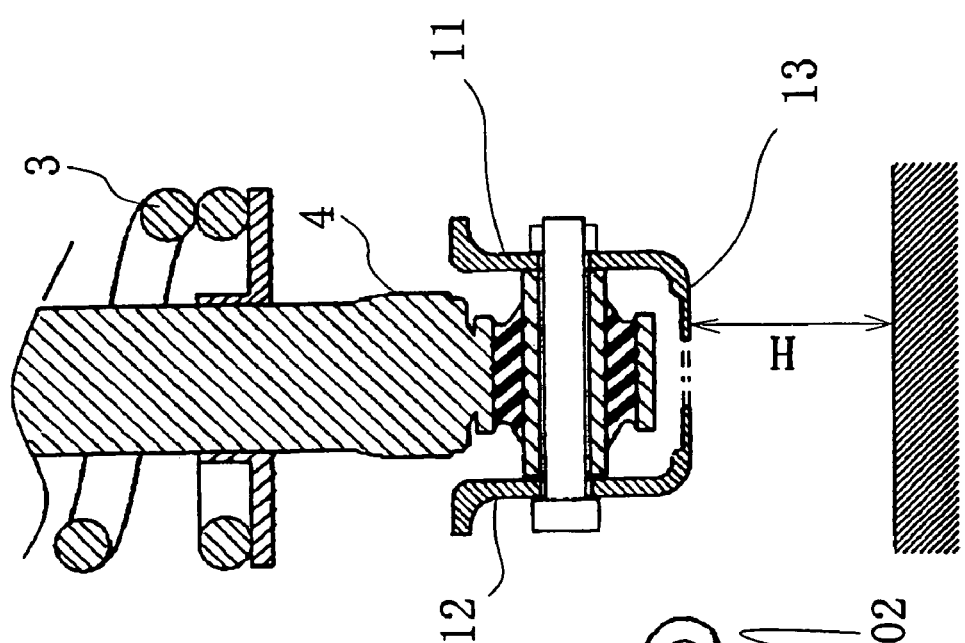
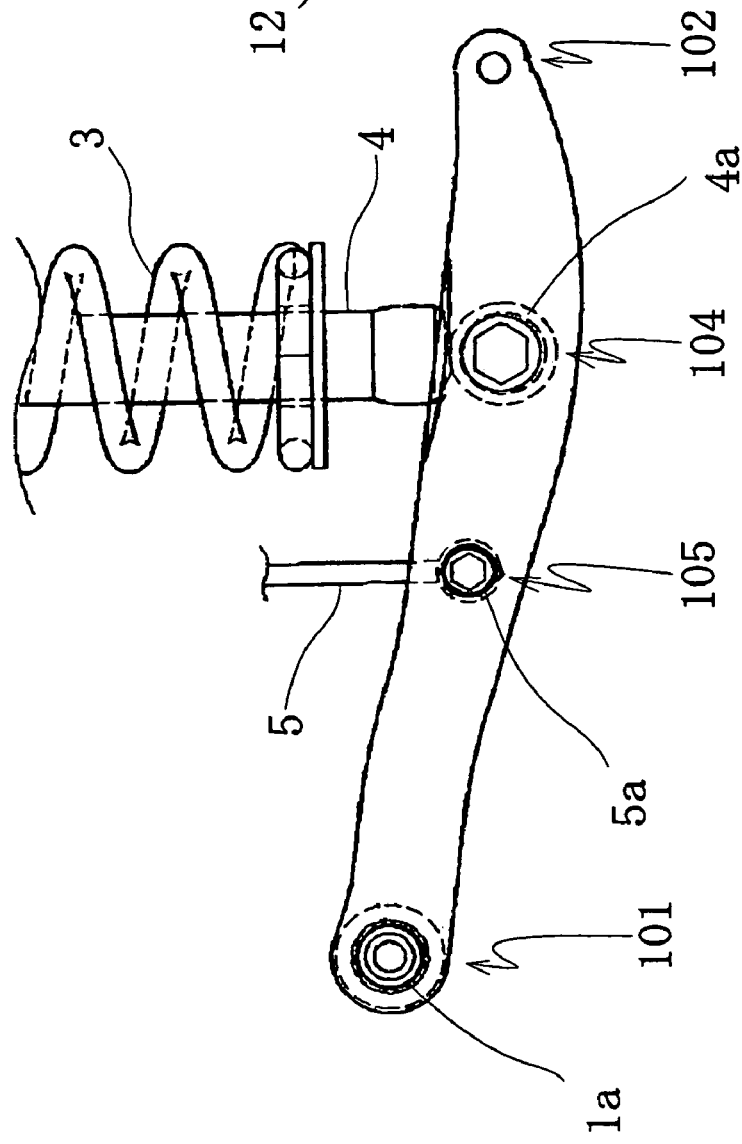
FIG. 4A
FIG. 4B

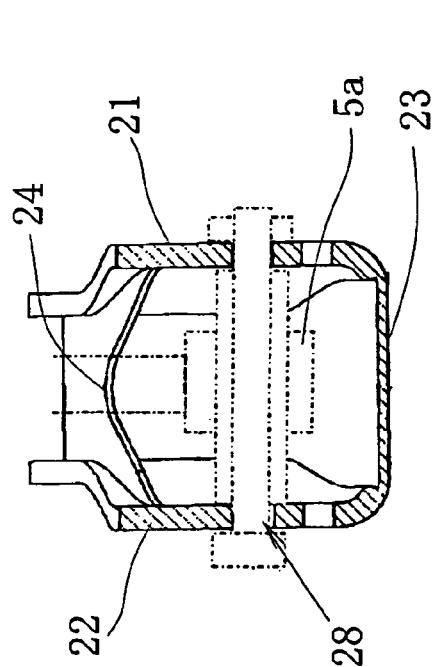
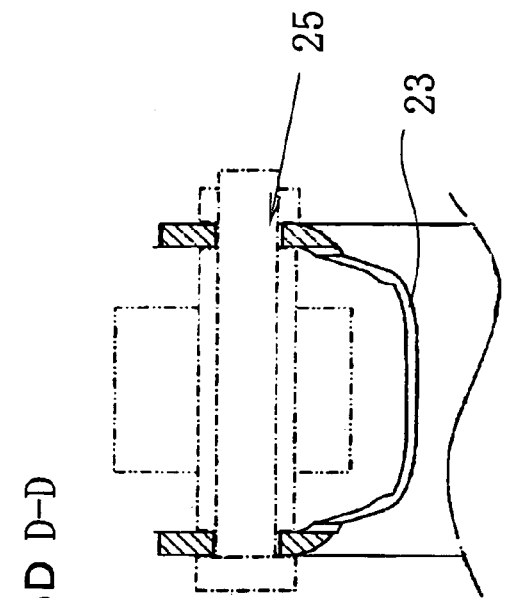
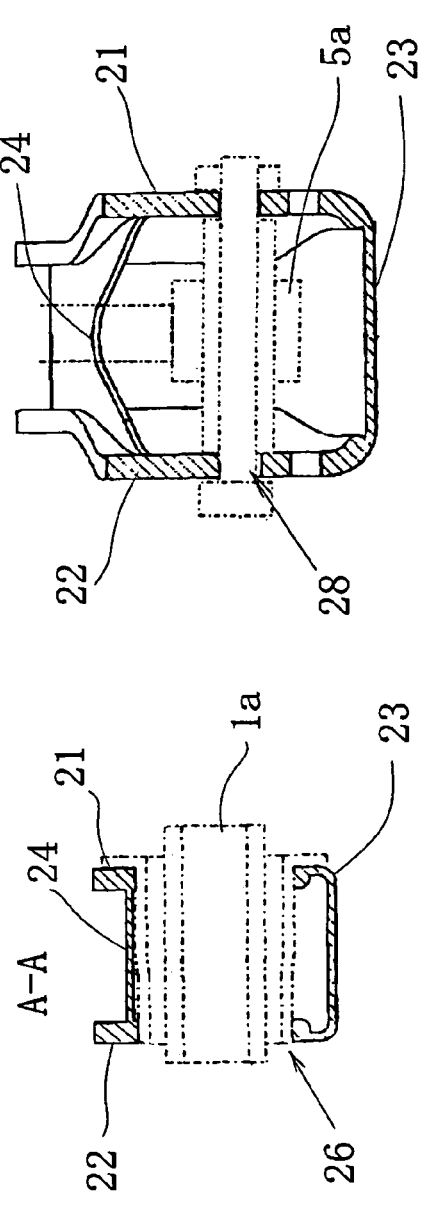
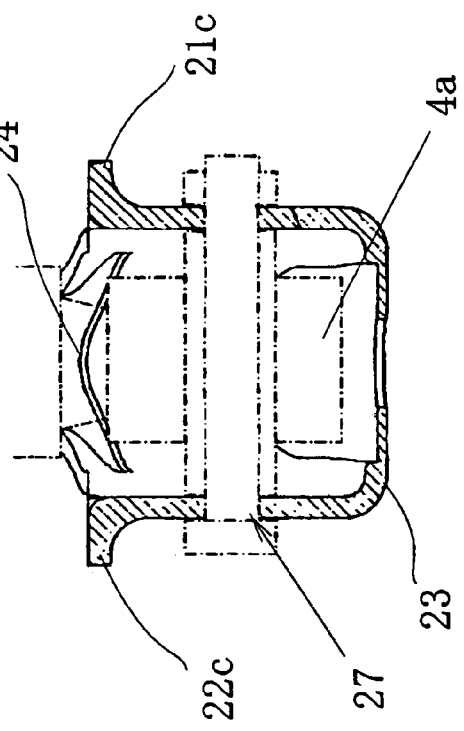

FIG. 12A
A-A
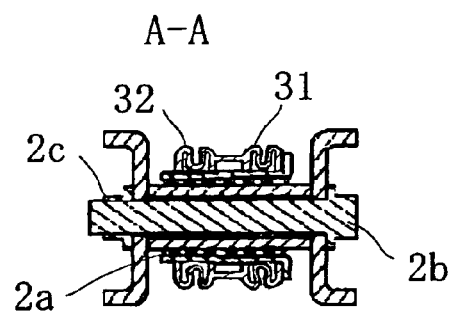
FIG. 12B
B-B
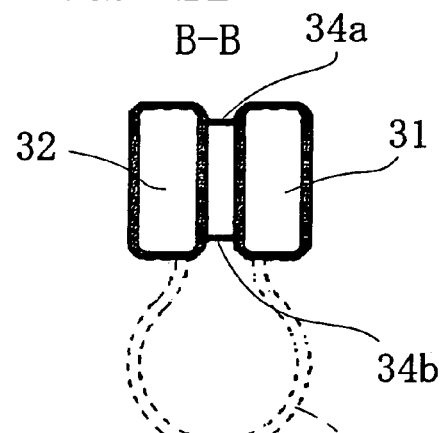
FIG. 12C C-C
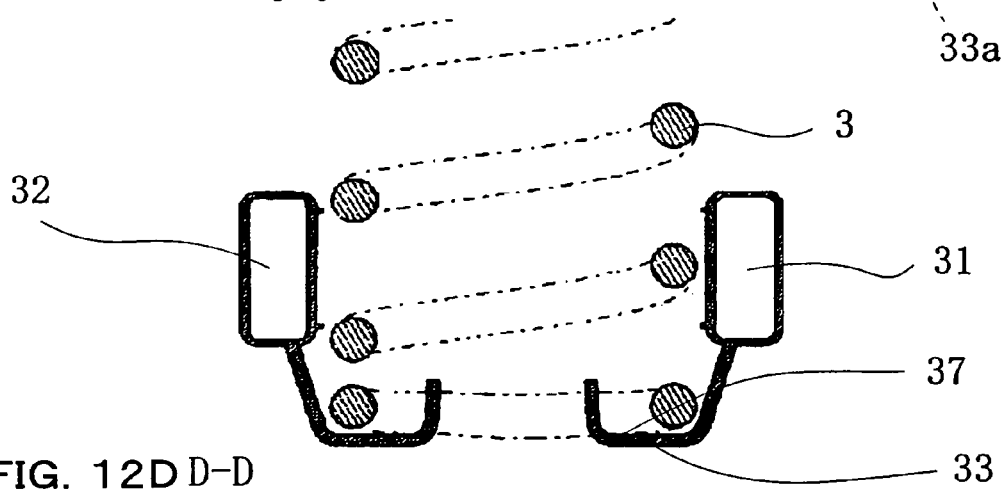
FIG. 12D D-D
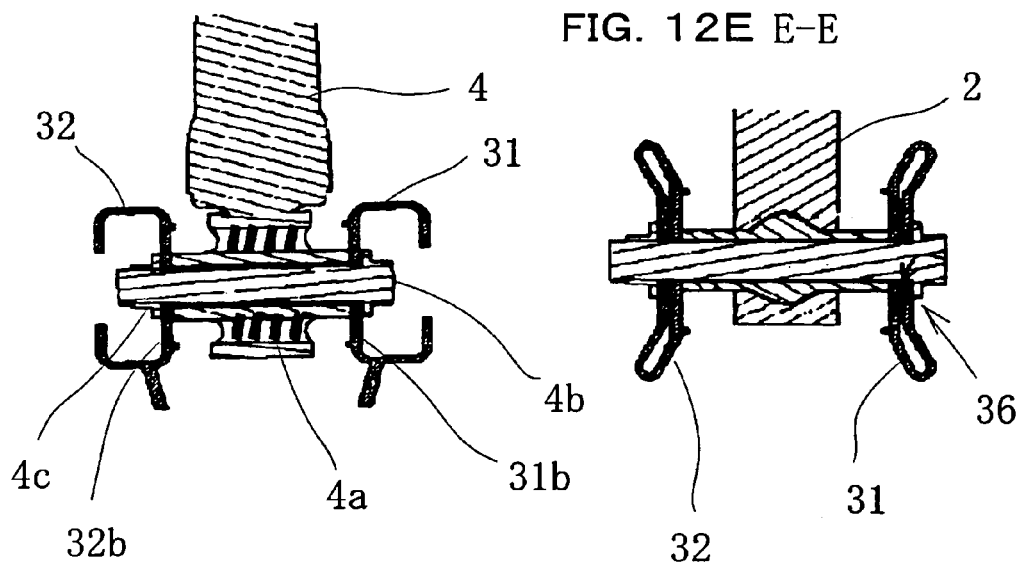
FIG. 12E E-E
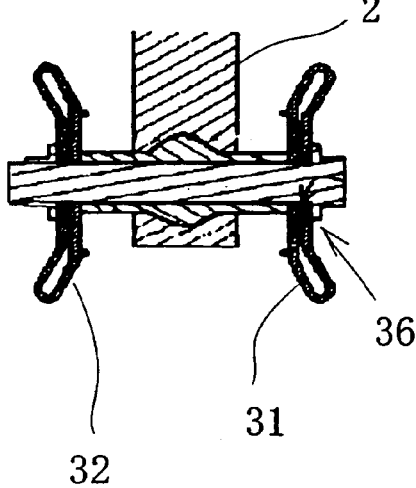

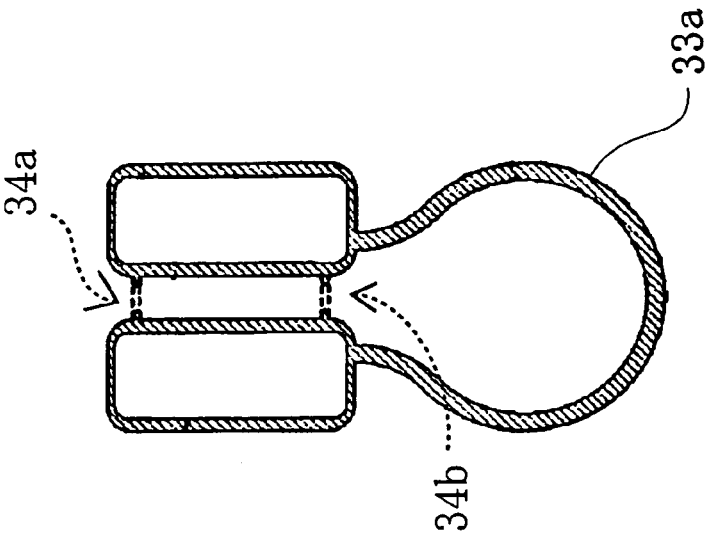
FIG. 14B X-X
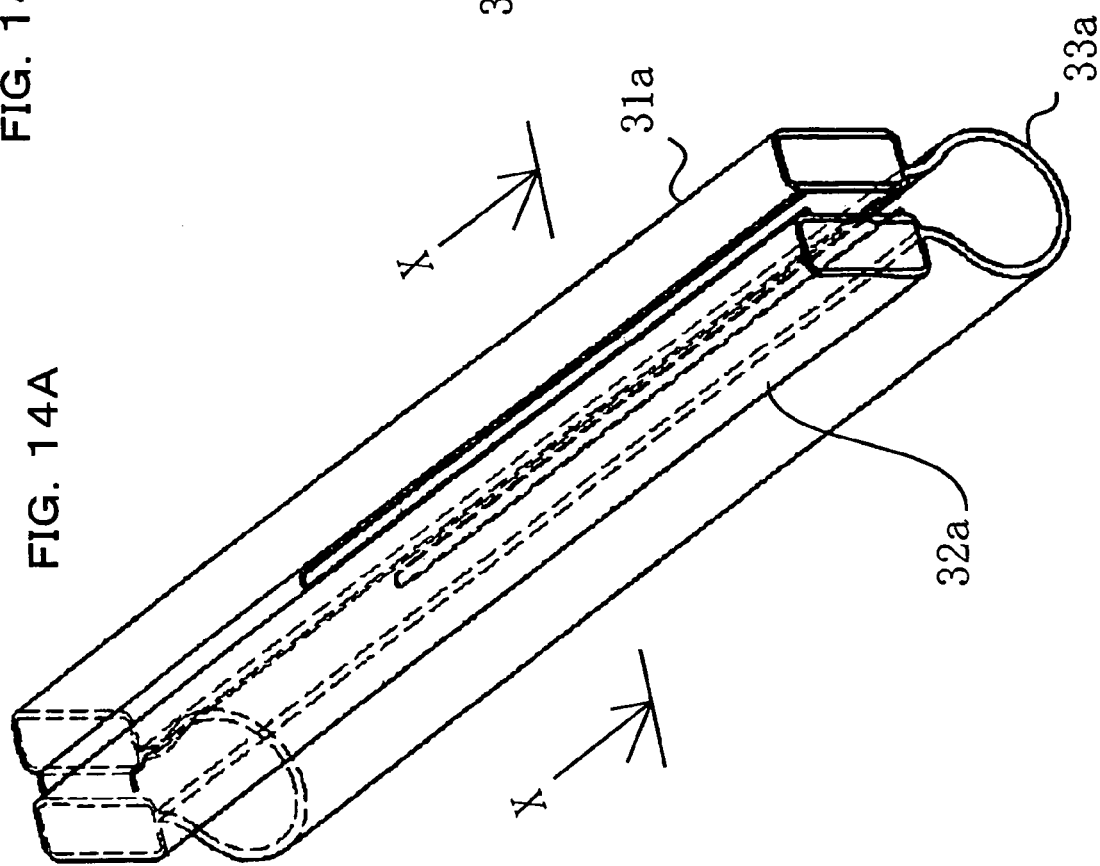
FIG. 14A

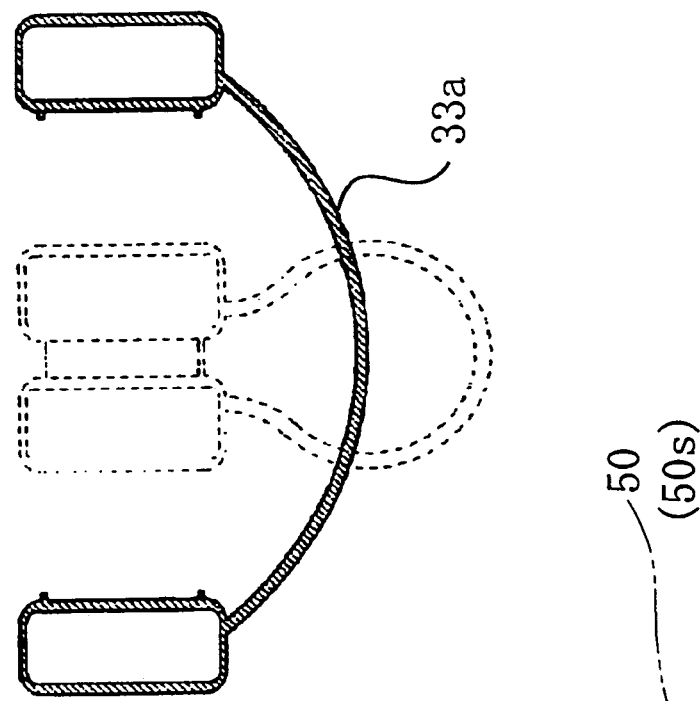
FIG. 15B X-X
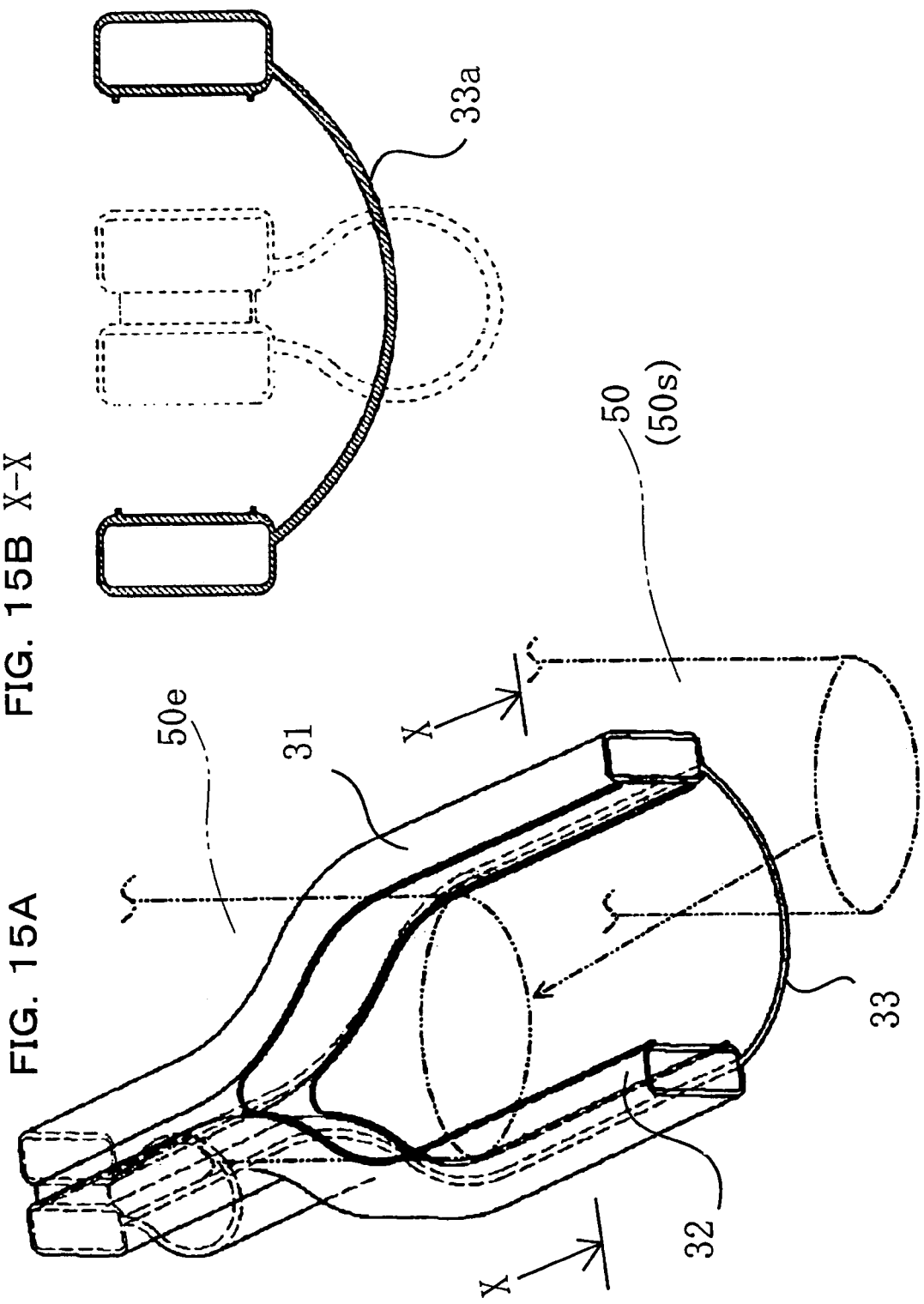
FIG. 15A

A-A

B-B

C-C

D-D

E-E

X-X

A-A

FIG. 25B X-X
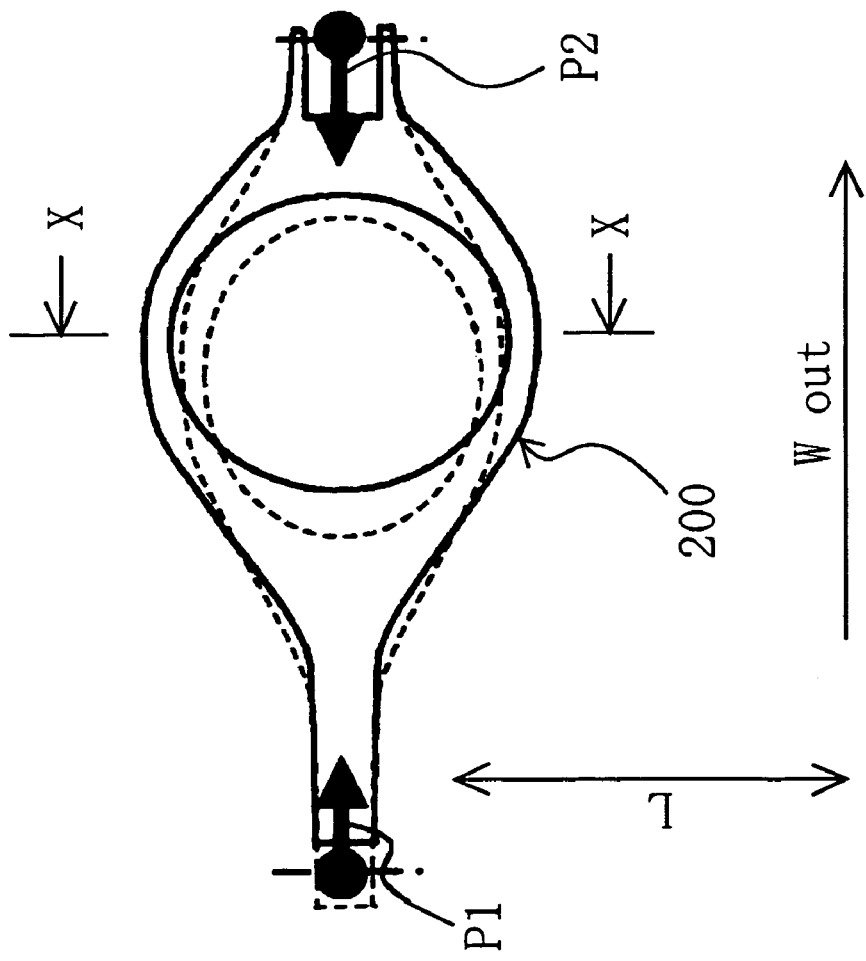
FIG. 25A

SUSPENSION ARM

CROSS REFERENCE TO RELATED APPLICATION

This application is a continuation of International Patent Application No. PCT/JP2004/002662, having an international filing date of Mar. 3, 2004, which designated the United States, the entirety of which is incorporated herein by reference. Japanese Patent Application No. 2003-191526, filed on Jul. 3, 2003, and Japanese Patent Application No. 2003-208732, filed on Aug. 25, 2003, are also incorporated herein by reference in their entirety.

BACKGROUND OF THE INVENTION

The present invention relates to a vehicular suspension arm.

As shown in FIG. 24, a centrifugal force G acts toward the right in the direction of the vehicle width when a vehicle turns left. The centrifugal force G acts upon reaction forces F1 and F2 respectively occurring due to the friction between a left tire 2L and a right tire 2R in the direction of the vehicle width and the road, so that a compressive force P1 due to the centrifugal force G and a reaction force P2 which is acted upon by the compressive force P1 occur in a right suspension arm 100R, and a tensile force T1 due to the centrifugal force G and a reaction force T2 which is acted upon by the tensile force T1 occur in a left suspension arm 100L. The forces act in the opposite directions when the vehicle turns right.

The suspension arm is acted upon by the above-mentioned forces when the vehicle makes a turn. In order to obtain a sufficient operation stability, a highly rigid suspension arm is required so that the amount of change in alignment due to deflection is reduced.

When the forces exceed the allowable rigidity limit of the suspension arm, a change in alignment occurs since permanent deformation remains, thereby adversely affecting the straight line stability.

In some suspensions, a shock absorber and a coil spring are integrally provided. However, since a suspension having an integral shock absorber/coil spring occupies a large space in the passenger compartment and the luggage compartment, a structure has been employed in which a coil spring 3 and a shock absorber 4 are separately disposed. In this structure, the coil spring which requires a large arrangement space is disposed under a side member, and a suspension arm 100 supports the lower end of the coil spring 3.

In an independent double wishbone rear suspension as shown in FIG. 24, the lower end of the shock absorber 4 or the coil spring 3 extending in the vertical direction of the vehicle is supported by the suspension arm 100L (100R).

An axle carrier 2 which holds the tire 2L (2R) is mounted on the outer end of the suspension arm 100L (100R) in the direction of the vehicle width, and the inner end of the suspension arm 100L (100R) is mounted on a suspension member 1.

As described above, the suspension arm 100L (100R) is incorporated into a suspension mechanism, and the shock absorber 4 or the coil spring 3 is supported by the suspension arm 100L (100R) between the support points of the axle carrier 2 and the suspension member 1 in the direction of the vehicle width to form a suspension device.

A stabilizer link, which is a link member of a stabilizer bar, may be mounted on the suspension arm in order to actuate a stabilizer mechanism.

Such a known suspension arm is generally formed by joining relatively inexpensive steel materials aiming at ensuring sufficient strength and rigidity (e.g. JP-A-2002-316228). In recent years, a suspension arm using a light metal material such as an aluminum alloy has been proposed aiming at reducing the weight of the suspension arm (e.g. WO 01/32979, JP-A-2000-225821, and JP-A-2002-274133).

In this case, the arm member may be formed by casting which allows a certain shape to be formed without limitations, or the arm member may be formed by extrusion in order to ensure sufficient strength.

However, when forming the suspension arm by joining steel materials in order to obtain strength (e.g. JP-A-2002-316228), since the cost of joining is high, the weakest coil spring support portion can be reinforced merely by joining. As shown in FIG. 25, a portion 200 between the coil spring support portion and the suspension member mounting portion is formed merely by pressing. In FIG. 25, deflection or deformation occurs in the cross section from the shape indicated by the dotted lines to the shape indicated by the solid lines due to the effects of the compressive force P1 and the reaction force P2, so that sufficient rigidity and strength cannot be obtained. This also applies to the case where the tensile force occurs.

In a structure in which the suspension member mounting portion and the axle carrier mounting portion have a continuous hollow cross section to obtain rigidity and strength (e.g. WO 01/32979), since the coil spring is placed on the hollow portion of the suspension arm, it is necessary to dispose the upper end of the coil spring upward in the vertical direction of the vehicle corresponding to the height of the cross section of the suspension arm, or to reduce the stroke of the suspension. This poses a problem in which the space of the passenger compartment must be reduced or the suspension performance must be decreased.

Since the shock absorber or coil spring mounting portion, the suspension member mounting portion, and the axle carrier mounting portion are formed in a shape optimum for the respective parts, the shape of each mounting portion of the suspension arm generally differs to a large extent. Therefore, when forming the suspension arm by extruding an aluminum alloy (e.g. JP-A-2000-225821), it is difficult to form the mounting portions having different shapes if the extruded aluminum alloy has an approximately uniform cross-sectional shape.

When forming the suspension arm by casting an aluminum alloy (e.g. JP-A-2002-274133), mounting portions having different shapes can be formed to a certain extent, so that the coil spring can be supported on the bottom surface of the suspension arm and the suspension arm can be reinforced using a rib. However, since a sufficient dimensional accuracy cannot be obtained for the center distance in the bearing portions on the ends for which a particularly high dimensional accuracy is required, it is necessary to provide a number of cutting steps after casting to secure dimensional accuracy, or to inspect casting internal defects, thereby increasing the number of steps and manufacturing cost.

The invention was achieved in view of the above-described situation. A technical object of the invention is to provide an arm member such as a suspension arm which can be reduced in weight while ensuring sufficient strength and rigidity without increasing of the number of steps and cost, which can support the lower end of a part such as a coil spring disposed at a low position, and of which the mounting portions can be formed in different shapes.

SUMMARY

A feature of the invention is that an arm member comprises an aluminum alloy extruded profile having a portion forming a bottom portion and portions forming at least two vertical walls, the arm member including connection portions in the vertical walls on one end and the vertical walls on the other end, and a part lower end support portion which supports a lower end of a part inserted through an opening and is provided between the connection portions on the ends and between the two vertical walls or at the bottom portion.

The term "aluminum alloy extruded profile" used herein means using an aluminum alloy which can be extruded by direct or indirect extrusion.

Therefore, an A 6000 series alloy, an A 7000 series alloy, an A 4000 series alloy, or an A 5000 series alloy, may be used as the alloy material.

In the invention, the arm member refers to an arm-shaped member which includes a connection portion which can be connected with another part or structure at each end, and supports one end (e.g. lower end) of another part (part differing from the part etc. connected with each end) on the side portion of the arm.

The arm member in the invention may be applied to various automotive parts such as a suspension arm, an impact beam, a door beam, and a bumper reinforcement.

In order to effectively utilize the feature of the extruded profile having high degrees of freedom of the cross section, it is preferable that the arm member be made of an aluminum alloy extruded profile having the portion forming the bottom portion, portions forming at least two vertical walls, and a horizontal rib which connects the two vertical walls, and include the part lower end support portion which supports the lower end of the part inserted from above the arm member and is formed between the two vertical walls or at the bottom portion by removing a part of the horizontal rib.

The lower end of the part can be supported corresponding to the shape of the part by gradually changing the interval between the two vertical walls in the portion in which the horizontal rib is removed.

The expression "gradually changing" used herein means plastic working the extruded profile not only in the direction in which the interval (width) between the two vertical walls is increased, but also in the direction in which the interval is decreased.

When applying the invention to a suspension arm, the suspension arm is made of an aluminum alloy extruded profile having a portion forming a bottom portion and portions forming at least two vertical walls, the suspension arm including a suspension member mounting portion in the vertical walls on one end, an axle carrier mounting portion in the vertical walls on the other end, and a suspension component lower end support portion which supports a lower end of a suspension component and is provided between the suspension member mounting portion and the axle carrier mounting portion and between the two vertical walls or at the bottom portion.

Since the suspension arm according to the invention is formed of the aluminum alloy extruded profile, the unsprung weight can be reduced. Moreover, since the support portion which supports the lower end of a shock absorber or a coil spring is formed inside the cross section of the arm, the height of the lower end of the shock absorber or the coil spring can be set to be approximately equal to the minimum height of the suspension arm.

As a result, the space of the passenger compartment or the luggage compartment can be increased by correspondingly decreasing the height of the upper end of the shock absorber or the coil spring, or riding comfort can be improved by increasing the suspension stroke.

The suspension arm may be made of an aluminum alloy extruded profile having a portion forming a bottom portion, portions forming at least two vertical walls, and a horizontal rib (connection rib) which connects the two vertical walls, and the suspension component lower end support portion may be formed between the two vertical walls or at the bottom portion by removing a part of the horizontal rib.

Since the horizontal rib (connection rib) which connects the two vertical walls prevents the cross section of the coil spring mounting portion from being deformed (increased in width) in the horizontal direction, deflection and deformation can be reduced.

The connection rib may be formed using another part by welding or riveting. However, the welding method decreases mechanical properties due to a thermal effect, and the riveting method results in insufficient bonding strength. Therefore, cost is increased and sufficient rigidity and strength cannot be obtained.

Therefore, the weight of the suspension arm can be inexpensively reduced while ensuring sufficient rigidity and strength by providing the connection rib integrally formed of the extruded profile.

Since the thickness of each portion can be arbitrarily changed by using the extruded profile, stress applied to the connection rib when compressive force or tensile force is applied to the suspension arm can be made uniform by changing the thickness of the connection rib, so that the weight of the suspension arm can be further reduced by eliminating an unnecessarily thick portion.

The suspension component lower end support portion may be formed by gradually changing the interval between the two vertical walls by plastic working in the portion in which the horizontal rib (connection rib) is removed.

Therefore, the shape of the support portion of the shock absorber or the coil spring, the shape of the suspension member mounting portion, and the shape of the axle carrier mounting portion can be set at optimum dimensions corresponding to the respective required performance. This makes it possible to make fine adjustments for reducing noise and vibration, whereby riding comfort can be further improved.

The suspension arm may be formed by plastic working the bottom portion in a wave shape.

Since the rigidity and strength of the horizontal wall of the bottom can be improved by forming the bottom in a wave shape, deflection and deformation can be reduced even in the portion in which the connection rib is removed. Specifically, the weight of the suspension arm is further reduced while maintaining the rigidity and strength of the suspension arm.

A portion of the extruded profile forming the vertical wall may have a hollow cross-sectional shape.

If the connection rib is not removed but allowed to remain near the coil spring mounting portion on the inner side or the outer side in the direction of the vehicle width, since the connection rib prevents the cross section of the coil spring mounting portion from being deformed (increased in width) in the horizontal direction when compressive force or tensile force is applied to the suspension arm, deflection and deformation can be sufficiently reduced. However, the weight of the suspension arm can be further reduced while ensuring the rigidity and strength of the suspension arm by forming the portion forming the vertical wall with a hollow cross-sectional shape.

A vertical wall having a closed hollow cross-sectional shape may be provided on the right and left of the coil spring, and the vertical wall may be a hollow portion continuously extending over approximately the total length of the suspension member mounting portion and the axle carrier mounting portion.

This prevents a small amount of deflection occurring in the portion forming the total length of the suspension arm, so that the weight of the suspension arm can be reduced while ensuring sufficient rigidity and strength even if the thickness of the vertical wall is reduced.

In particular, since the vertical walls connected with the ends of the bottom surface which supports the lower end of the coil spring are reinforced by the left hollow portion and the right hollow portion in the coil spring mounting portion, a minute deflection or deformation of the vertical walls can be reduced.

A significant effect can be obtained by providing one horizontal rib. Note that an extruded profile having two or more horizontal ribs may be used as the material.

Since it is unnecessary to remove the horizontal rib from a portion which does not support the suspension component, if two or more horizontal ribs (connection ribs connecting the two vertical walls) are provided in that portion, a closed cross section is additionally formed by the horizontal rib, whereby the rigidity is further improved.

The suspension member mounting portion and/or the axle carrier mounting portion may be formed by compressing a part of the hollow portion of the vertical wall.

This allows the thickness corresponding to the outer vertical and the inner vertical wall to be substantially secured, whereby the mounting portion is prevented from being sheared.

BRIEF DESCRIPTION OF THE SEVERAL VIEWS OF THE DRAWING

FIGS. 2A to 2D are cross-sectional views showing part of the suspension arm; FIG. 2A is a cross-sectional view of a mounting portion 101 for a suspension member 1 (cross-sectional view along the line A-A shown in FIG. 1), FIG. 2B is a cross-sectional view of a mounting portion 105 for a stabilizer link 5 (cross-sectional view along the line B-B shown in FIG. 1), FIG. 2C is a cross-sectional view of a mounting portion 104 for a shock absorber 4 (cross-sectional view along the line C-C shown in FIG. 1), and FIG. 2D is a cross-sectional view of a mounting portion 102 for a axle carrier 2 (cross-sectional view along the line D-D shown in FIG. 1).

FIG. 3 is a cross-sectional view of an extruded profile used for the suspension arm 10.

FIG. 4A is a front view in a state in which the peripheral parts (e.g. shock absorber 4) are installed, and FIG. 4B is a cross-sectional view along the line E-E shown in FIG. 4A.

FIG. 6A is a cross-sectional view of the mounting portion 101 for the suspension member 1 (cross-sectional view along the line A-A shown in FIG. 5), FIG. 6B is a cross-sectional view of the mounting portion 105 for the stabilizer link 5 (cross-sectional view along the line B-B shown in FIG. 5), FIG. 6C is a cross-sectional view of the mounting portion 104 for the shock absorber 4 (cross-sectional view along the line C-C shown in FIG. 5), and FIG. 6D is a cross-sectional view of the mounting portion 102 for the axle carrier 2 (cross-sectional view along the line D-D shown in FIG. 5).

FIG. 12A is a cross-sectional view of the mounting portion 101 for the suspension member 1 (cross-sectional view along the line A-A shown in FIG. 11B), FIG. 12B is a cross-sectional view of a section which connects the suspension member mounting portion 101 and the mounting portion 103 for the coil spring 3 (cross-sectional view along the line B-B shown in FIG. 11B), FIG. 12C is a cross-sectional view of the coil spring mounting portion 103 (cross-sectional view along the line C-C shown in FIG. 11A), FIG. 12D is a cross-sectional view of the mounting portion 104 for the shock absorber 4 (cross-sectional view along the line D-D shown in FIG. 11A), and FIG. 12E is a cross-sectional view of the mounting portion 102 for the axle carrier 2 (cross-sectional view along the line E-E shown in FIG. 11A). FIGS. 12A to 12E show a state in which the peripheral parts (e.g. coil spring) of the suspension arm 30 are mounted on the suspension arm 30.

FIG. 14A is a perspective view in a stage in which the horizontal ribs connecting the left hollow portion and the right hollow portion are removed in the area between the coil spring mounting portion 103 and the axle carrier mounting portion 102 after subjecting the extruded profile having a cross-sectional shape shown in FIG. 13 to a solution treatment, and FIG. 14B is cross-sectional view along the line X-X shown in FIG. 14A.

FIG. 15A is a perspective view showing a stage in which the left hollow portion and the right hollow portion are separated from the stage shown in FIGS. 14A and 14B in the area in which the horizontal ribs are removed, and FIG. 15B is cross-sectional view along the line X-X shown in FIG. 15A.

FIGS. 25A and 25B schematically show a state in which deflection or deformation occurs in the cross section from the shape indicated by the dotted line to the shape indicated by the solid line due to the effect of a compressive force P1 and a reaction force P2.

DETAILED DESCRIPTION OT THE EMBODIMENT

Figure 1:
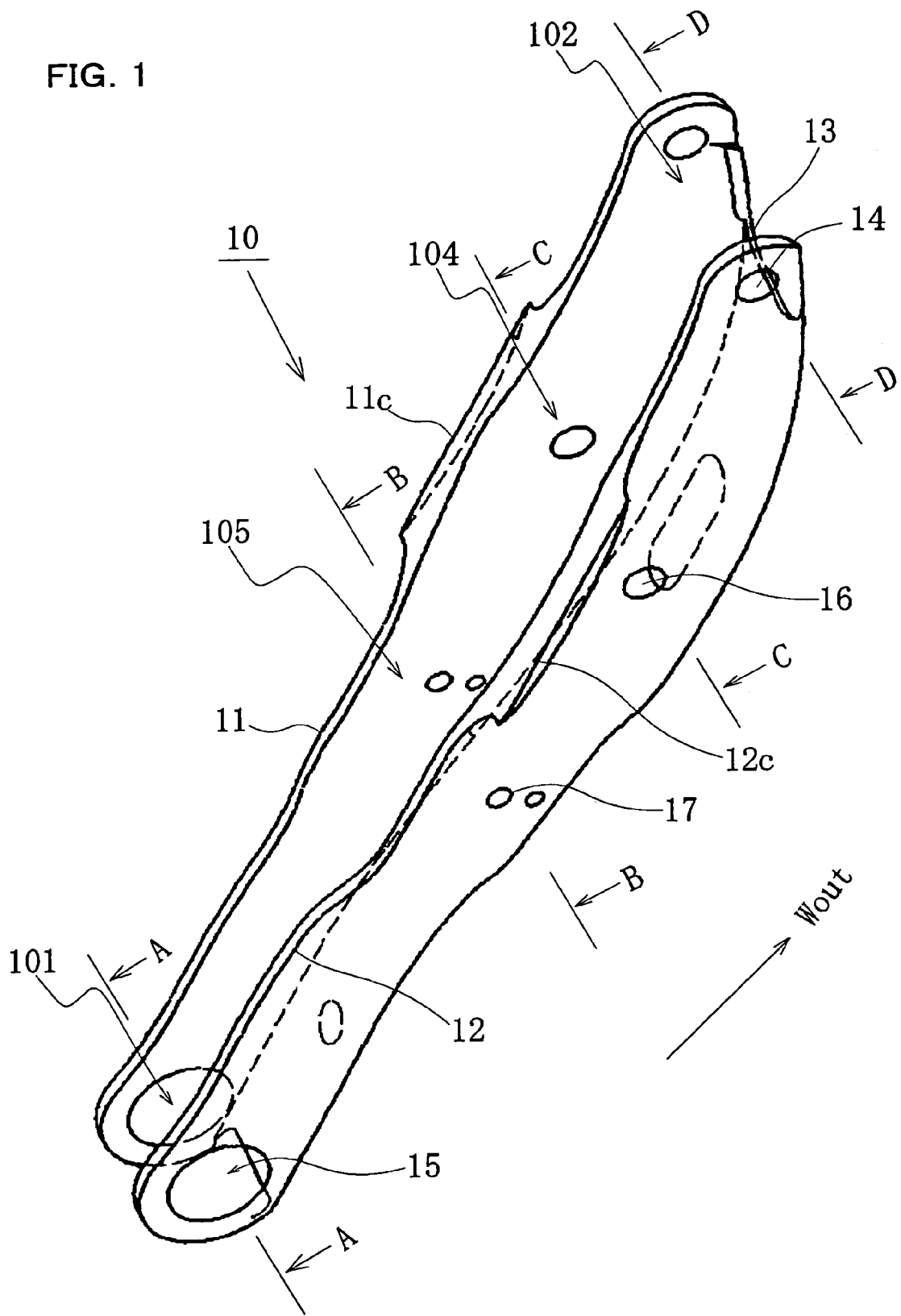
FIG. 1 is a perspective view of a suspension arm 10 according to the invention.

FIG. 1 is a perspective view of a suspension arm 10 according to the invention.

FIGS. 2A to 2D are cross-sectional views showing part of the suspension arm, which is described together with the assembly drawing of FIGS. 4A and 4B.

FIG. 2A is a cross-sectional view of a mounting portion 101 for a suspension member 1 (cross-sectional view along the line A-A shown in FIG. 1), FIG. 2B is a cross-sectional view of a mounting portion 105 for a stabilizer link 5 (cross-sectional view along the line B-B shown in FIG. 1), FIG. 2C is a cross-sectional view of a mounting portion 104 for a shock absorber 4 (cross-sectional view along the line C-C shown in FIG. 1), and FIG. 2D is a cross-sectional view of a mounting portion 102 for a axle carrier 2 (cross-sectional view along the line D-D shown in FIG. 1). In FIGS. 2A to 2D, the peripheral parts (e.g. shock absorber 4) of the suspension arm 10 are indicated by the two-dot chain lines and illustrated in an assembled state. FIG. 3 is a cross-sectional view of an extruded profile used for the suspension arm 10. FIG. 4A is a front view in a state in which the peripheral parts (e.g. shock absorber 4) are installed, and FIG. 4B is a cross-sectional view along the line E-E shown in FIG. 4A.

The suspension arm 10 is produced by forming an extruded profile produced by extruding an A 6000 series (Al—Mg—Si) aluminum alloy to have an approximately U-shaped cross section as shown in FIG. 3, for example.

As shown in FIG. 3, the cross-sectional shape of an extruded profile 10a is approximately in the shape of the letter "U" having a height of D and an open width of H. Two opposite vertical walls 11a and 12a form vertical walls 11 and 12 of the suspension arm (product) by plastic working.

A bottom portion 13a which connects the two vertical walls and forms the bottom of the approximately U-shaped configuration forms the bottom portion of the product.

In the example shown in FIG. 3, the thicknesses of the vertical walls 11a and 12a are greater than the thickness of the bottom portion.

R-shaped corner portions 11b and 12b are respectively formed between the vertical walls and the bottom portion.

Ribs (flange portions) 11c and 12c extend at the upper ends of the vertical walls toward the outside in the horizontal direction (in FIG. 3, the rib 11c extends toward the right and the rib 12c extends toward the left).

As shown in FIG. 1, the cross-sectional shape of each portion of the suspension arm 10 is optimized by forming the suspension member mounting portion 101, the axle carrier mounting portion 102, the shock absorber mounting portion 104, and the stabilizer link mounting portion 105 by press working the extruded profile, for example.

Specifically, each portion of the suspension arm 10 is formed by plastic working so that the open width L of the extruded profile is gradually increased.

When the extruded profile is press formed so that each portion has a predetermined shape, the upper portion of the vertical wall in the vertical direction of the vehicle is removed in the area other than the area near the shock absorber mounting portion 104.

The suspension member mounting portion 101 and the axle carrier mounting portion 102 positioned at either end of the suspension arm 10 are cut in the shape of an arc.

Mounting holes 14a, 15a, 16a, and 17a are press punched in the respective mounting portions.

The bottom portion is removed in the axle carrier mounting portion 102.

The suspension arm 10 is then subjected to a heat treatment, if necessary.

As shown in FIGS. 4A and 4B, this example of the suspension arm 10 is a type in which a coil spring 3 is assembled with the shock absorber 4 and the suspension arm 10 supports the stabilizer link 5.

The inner end of the suspension arm 10 in the direction of the vehicle width forms the suspension member mounting portion 101, and a bushing 1a positioned at the lower end of the suspension member 1 is mounted in a mounting hole 15 in the suspension member mounting portion 101.

As shown in FIG. 2A, the upper side of the vertical wall is removed in the suspension member mounting portion 101. Since the suspension member mounting portion 101 is plastically deformed, the open width of the vertical wall is equal to the open width L shown in FIG. 3.

The open width is not increased from the suspension member mounting portion 101 to the area positioned on the inner side of the stabilizer link mounting portion 105.

In the stabilizer link mounting portion 105, a lower bushing 5a positioned at the lower end of the stabilizer link 5 is mounted in a mounting hole 17 in the stabilizer link mounting portion 105 using a bolt 5b and a nut 5c.

As shown in FIG. 2B, the open width of the vertical wall is increased by press working, the open width of the vertical wall becomes larger than the open width L.

In this case, a part of the lower portion of the vertical wall is positioned at the bottom portion.

A part of the upper portion of the vertical wall is removed in an amount smaller than that in the suspension member mounting portion 101.

In the shock absorber mounting portion 104, a lower bushing 4a positioned at the lower end of the shock absorber 4 is mounted in a mounting hole 16 in the shock absorber mounting portion 104 using a bolt 4b and a nut 4c.

Specifically, the shock absorber mounting hole 16 which is a support portion supporting the lower end of the shock absorber 4 is positioned inside the cross section of the arm of the suspension arm 10.

As shown in FIG. 2C, since the open width is further increased in comparison with the stabilizer link mounting portion 105, a part of the lower portion of the vertical wall is positioned at the bottom portion in an amount greater than that shown in FIG. 2B.

In this portion, the upper portion of the vertical wall is not removed. Therefore, the ribs 11c and 12c remain.

The inner end of the suspension arm 10 in the direction of the vehicle width forms the axle carrier mounting portion 102. The lower end of the axle carrier 2 is mounted in a mounting hole 14 in the axle carrier mounting portion.

As shown in FIG. 2D, the upper portion and the lower portion of the vertical wall are removed in the axle carrier mounting portion 102, and the open width is L.

As described above, the shock absorber mounting portion 104 and the stabilizer link mounting portion 105 are positioned between the suspension member mounting portion 101 and the axle carrier mounting portion 102, in which the open width is gradually increased by press working.

The height of each mounting portion is adjusted by cutting.

Specifically, since the shock absorber mounting portion 104 must have the highest strength, the shock absorber mounting portion 104 has a large cross-sectional shape. The weight of the suspension arm 10 is reduced by removing the portions other than the shock absorber mounting portion 104 while avoiding other parts.

The thicknesses of the vertical walls 11 and 12 are increased so that the vertical walls 11 and 12 are not sheared due to the mounting hole. On the other hand, the thickness of the bottom portion which does not have the mounting hole is reduced to reduce the weight of the suspension arm 10.

As described above, since the suspension arm according to the invention is formed of the aluminum alloy extruded profile, the unsprung weight can be reduced. Moreover, since the support portion which supports the lower end of the shock absorber is formed inside the cross section of the arm, the lower end of the shock absorber can be set to be lower as shown in FIG. 4B.

As a result, the space of the passenger compartment or the luggage compartment can be increased by correspondingly decreasing the height of the upper end of the shock absorber, or riding comfort can be improved by increasing the suspension stroke.

The rigidity of the suspension member mounting portion 101 and the axle carrier mounting portion 102 can be ensured by increasing the thickness of the vertical wall, and the weight of the suspension arm can be reduced by reducing the thickness of the bottom portion.

The shape of the support portion of the shock absorber 4, the shape of the suspension member mounting portion and the shape of the axle carrier mounting portion can be set at optimum dimensions corresponding to respective required performance by forming the suspension arm by press working the extruded profile having an approximately U-shaped cross section so that the open width L of the extruded profile is partially increased. This makes it possible to make a fine adjustment for reducing noise and vibration, whereby riding comfort can be further improved.

In addition, the amount of plastic deformation until the final form is obtained can be reduced by using the extruded profile having an approximately U-shaped cross section in comparison with the case of press working a sheet material, whereby the number of working steps can be reduced, and occurrence of cracks during plastic working can be reduced.

Figure 5:
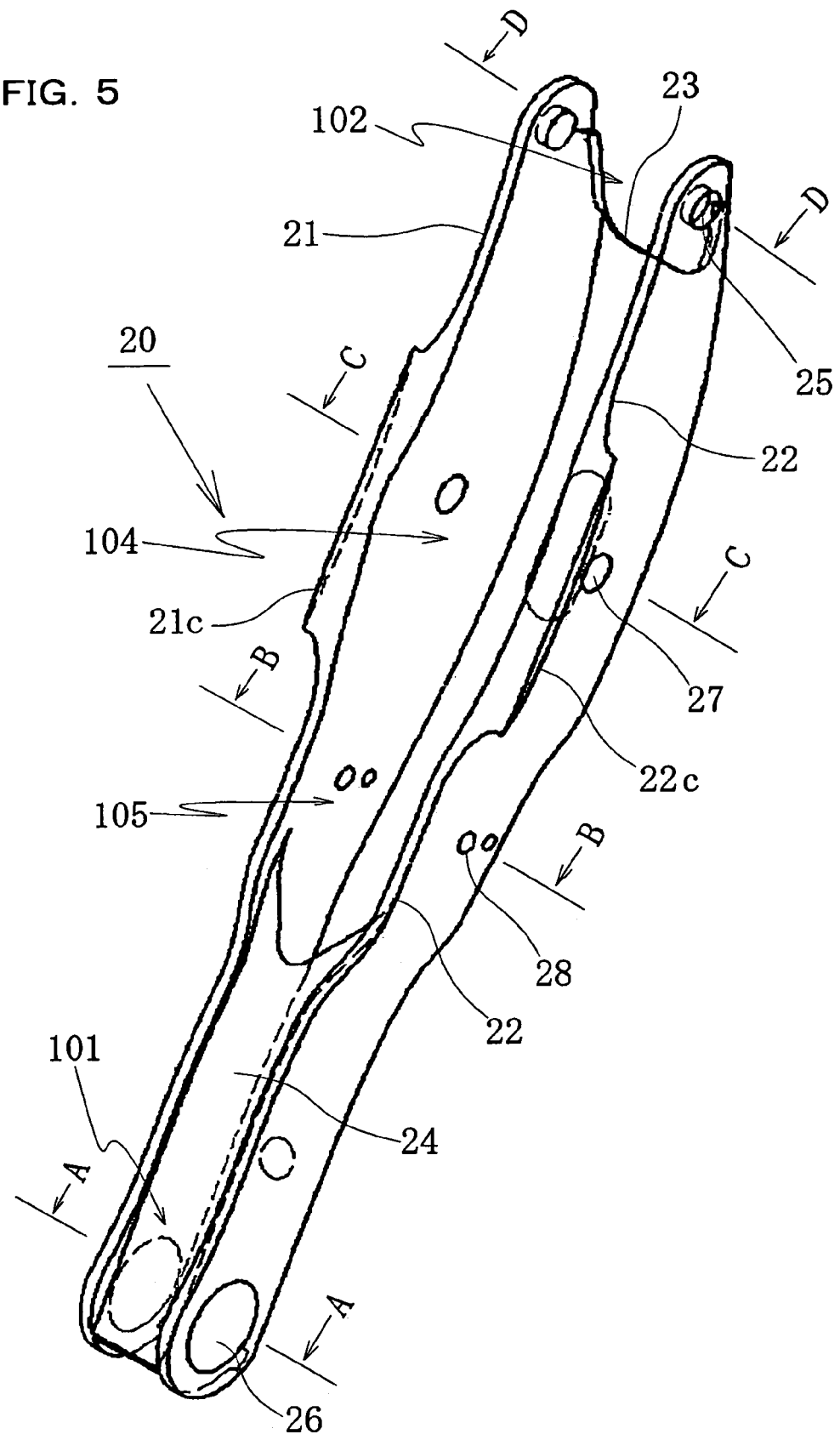
FIG. 5 is a perspective view of a suspension arm 20 according to another embodiment of the invention.

FIG. 5 is a perspective view of a suspension arm 20 according to another embodiment of the invention.

FIG. 6A is a cross-sectional view of the mounting portion 101 for the suspension member 1 (cross-sectional view along the line A-A shown in FIG. 5), FIG. 6B is a cross-sectional view of the mounting portion 105 for the stabilizer link 5 (cross-sectional view along the line B-B shown in FIG. 5), FIG. 6C is a cross-sectional view of the mounting portion 104 for the shock absorber 4 (cross-sectional view along the line C-C shown in FIG. 5), and FIG. 6D is a cross-sectional view of the mounting portion 102 for the axle carrier 2 (cross-sectional view along the line D-D shown in FIG. 5).

Figure 7:
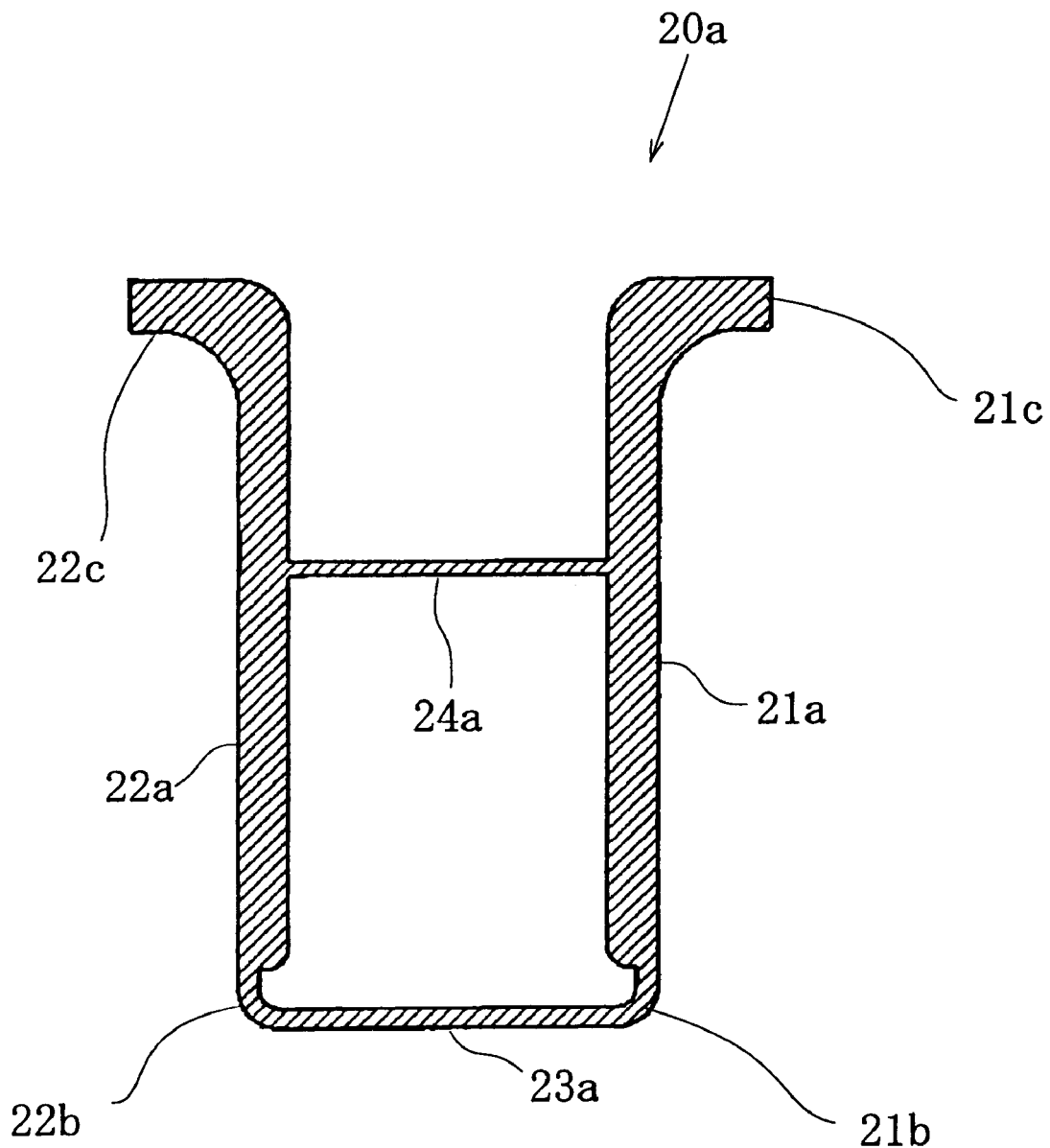
FIG. 7 is a cross-sectional view of an extruded profile 20a used for the suspension arm 20.
Figure 8A:
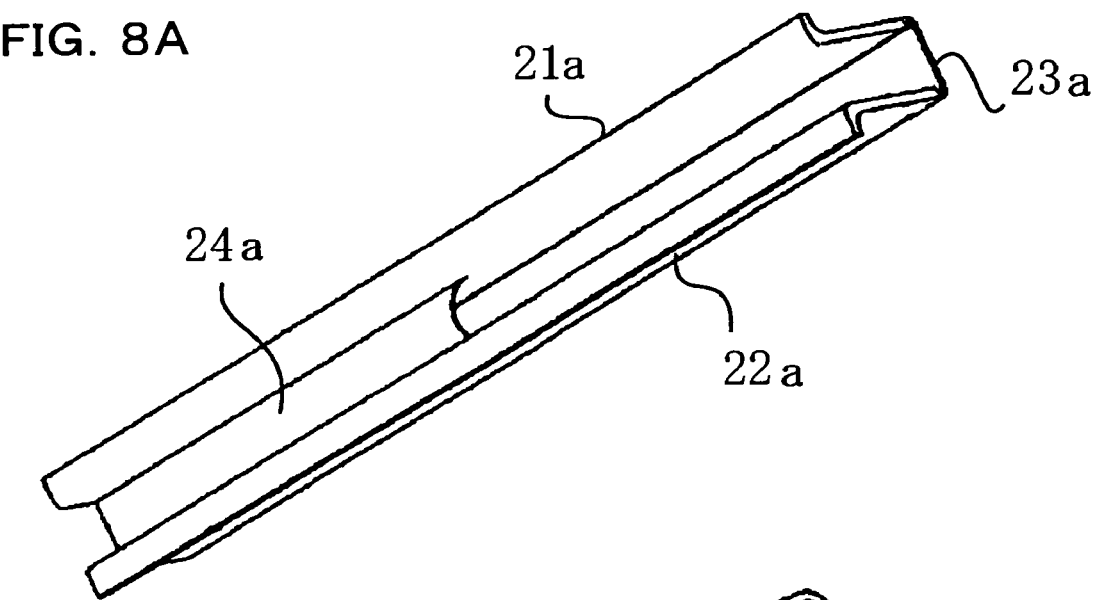
FIGS. 8A and 8B are perspective views showing a process of forming a suspension arm from an extruded profile.
Figure 8B:
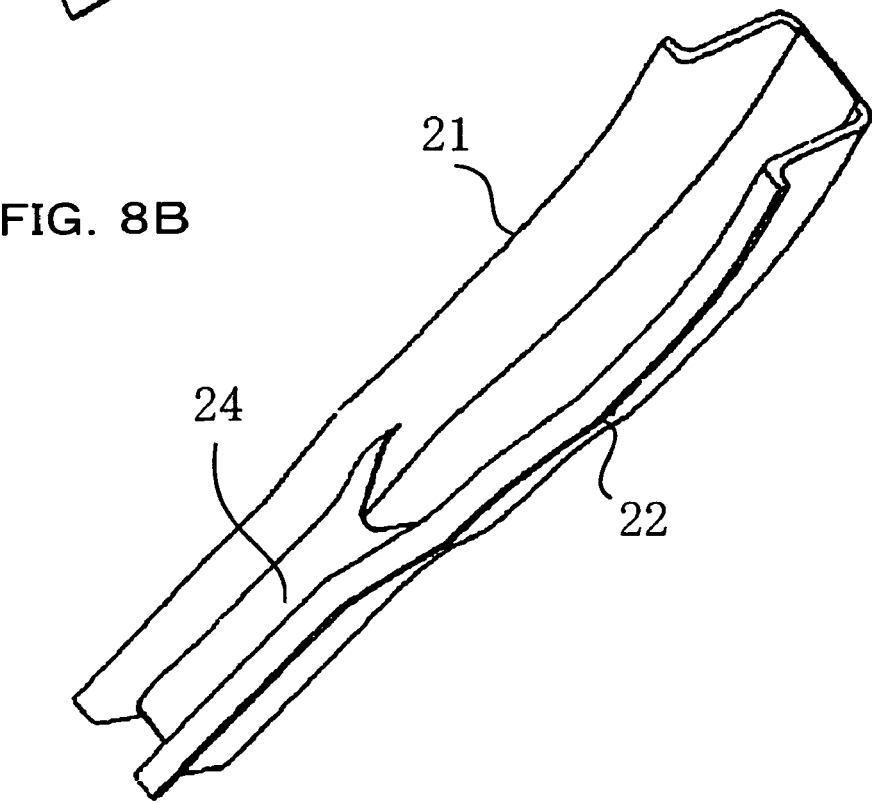

FIG. 7 is a cross-sectional view of an extruded profile 20a used for the suspension arm 20, and FIGS. 8A and 8B are perspective views showing a process of forming the suspension arm using the extruded profile.

The second embodiment differs from the first embodiment in that the extruded profile having a U-shaped cross-sectional shape has a closed cross-sectional shape, as shown in FIG. 7.

Specifically, the extruded profile has two opposite vertical walls 21a and 22a, a bottom portion 23a which connects the two vertical walls and forms the bottom of the approximately U-shaped configuration, and a horizontal rib 24a (connection rib). A hollow closed cross-sectional shape is formed by the vertical walls, the bottom portion, and the horizontal rib.

The upper portion of the vertical wall higher than the horizontal rib forms a flange portion extending upward from the closed cross-sectional shape, and ribs 21c and 22c extend toward the outside in the horizontal direction.

In the suspension arm 20 according to the second embodiment, the horizontal rib 24a is removed by, for example, punching before press working the extruded profile in the first embodiment so that the extruded profile has a partial open cross section, as shown in FIG. 8A. The extruded profile is then subjected to plastic working in the same manner as in the first embodiment so that the open width L of the extruded profile is gradually increased to obtain a state as shown in FIG. 8B. A cutting step is then performed to obtain a state as shown in FIG. 5.

The rigidity can be obtained by the hollow cross section by using the extruded profile having a closed cross-sectional shape between the suspension member mounting portion and the stabilizer link mounting portion.

Since the rigidity of the entire suspension arm can be improved by increasing the rigidity by forming a hollow cross section in the area in which the width of the cross section is not increased, an alignment change during turning of the vehicle can be prevented, whereby operation stability can be improved.

The shape of the support portion which supports the shock absorber 4 can be formed by removing the horizontal rib so that a partial open cross section is formed and subjecting the extruded profile to plastic working so that the open width of the open cross section is gradually increased.

The first and second embodiments illustrate the examples in which the shock absorber 4 assembled with the coil spring 3 is supported on the suspension arm. Note that the invention may be applied to a suspension arm which individually supports the coil spring 3 and the shock absorber 4 by merely changing the size and the thickness of each mounting portion, as shown in FIGS. 9A and 9B.

Figure 9B:
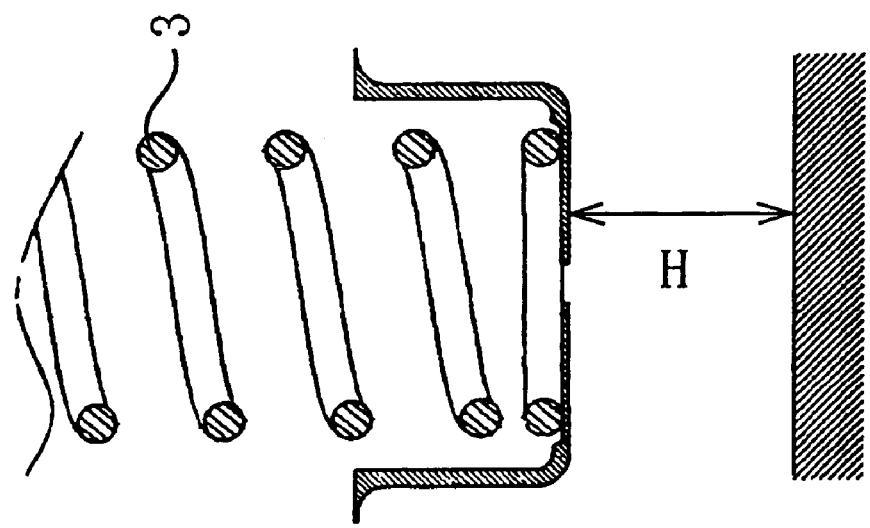
FIGS. 9A and 9B show examples of a suspension arm which separately supports the coil spring 3 and the shock absorber 4.
Figure 9A:
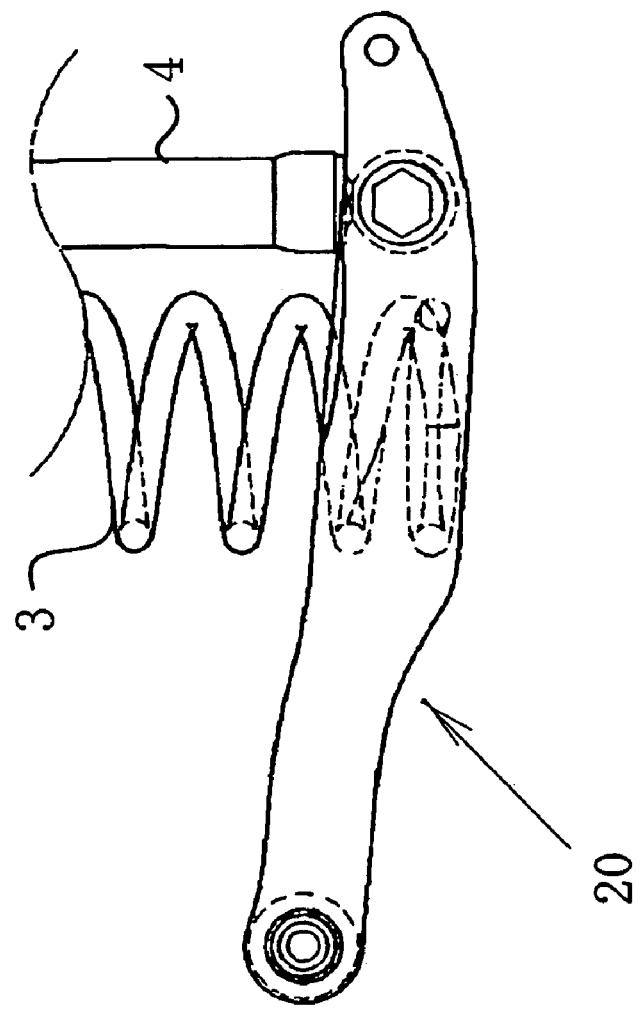

In this case, the bottom portion of the suspension arm functions as the support portion, as shown in FIG. 9B.

The invention may also be applied to a suspension arm which only supports the coil spring 3 or a suspension arm which only supports the shock absorber 4.

Figure 10:
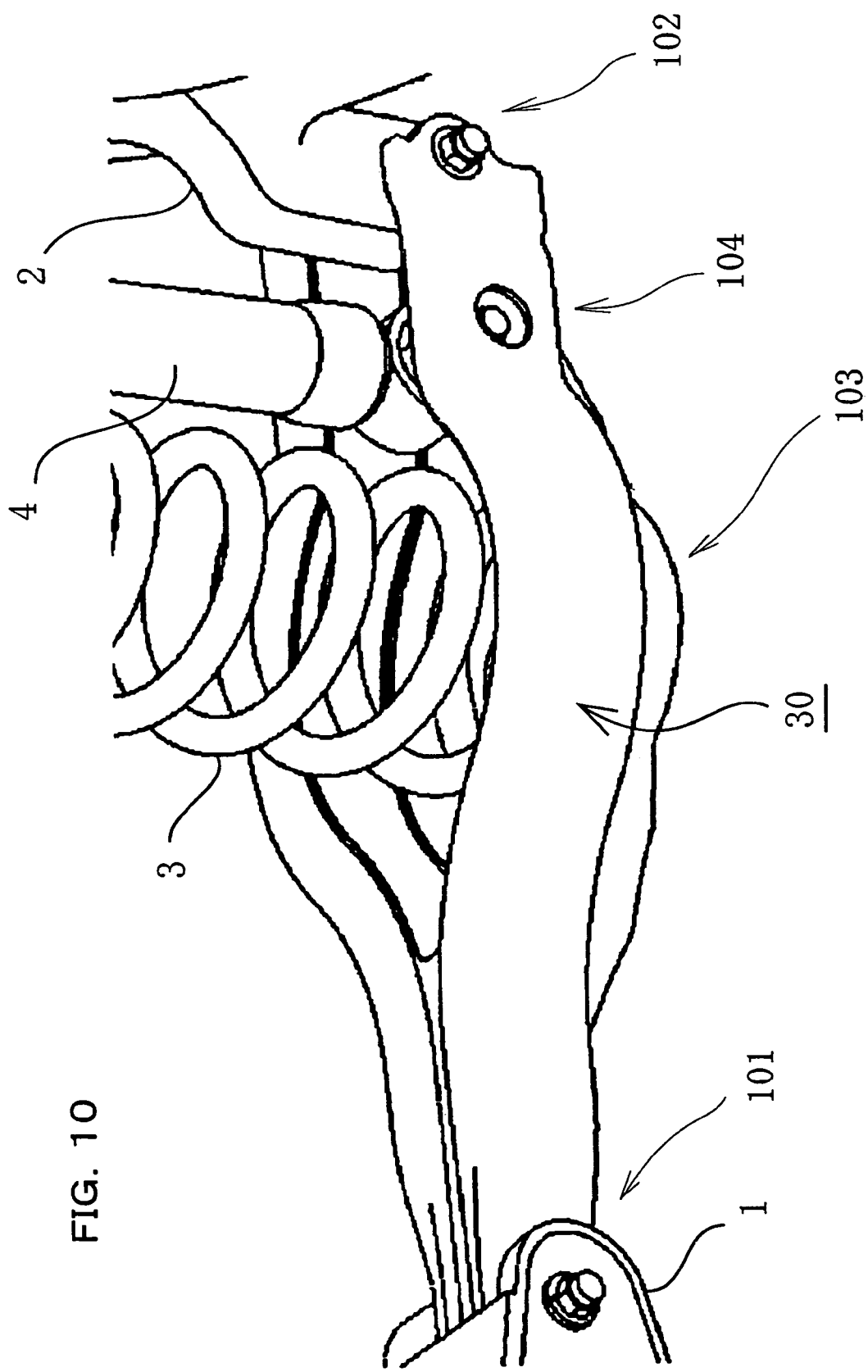
FIG. 10 shows an embodiment of a suspension arm 30 as another example.
Figure 11B:
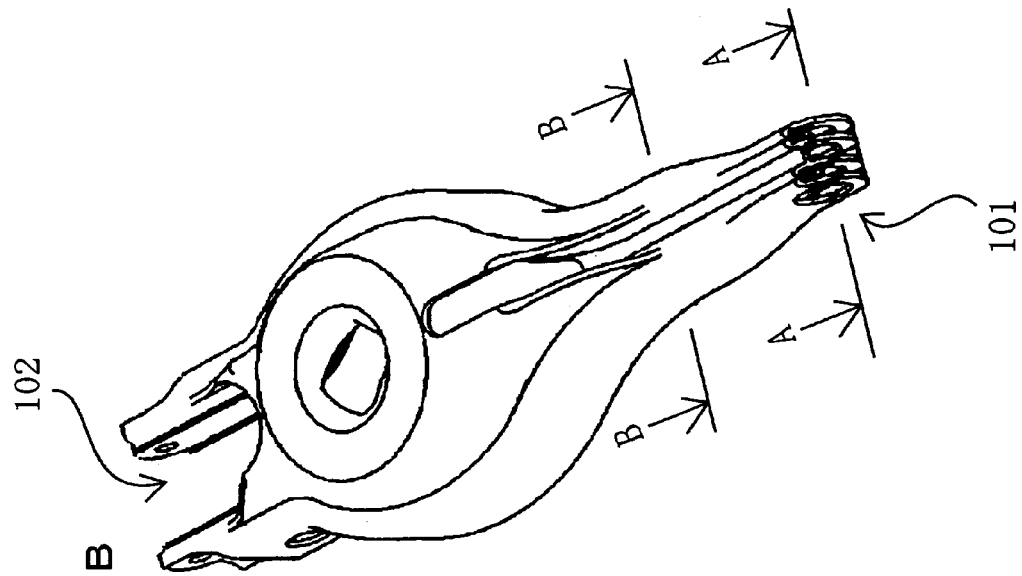
FIG. 11B is a perspective view from the lower side of the suspension arm 30.
Figure 11A:
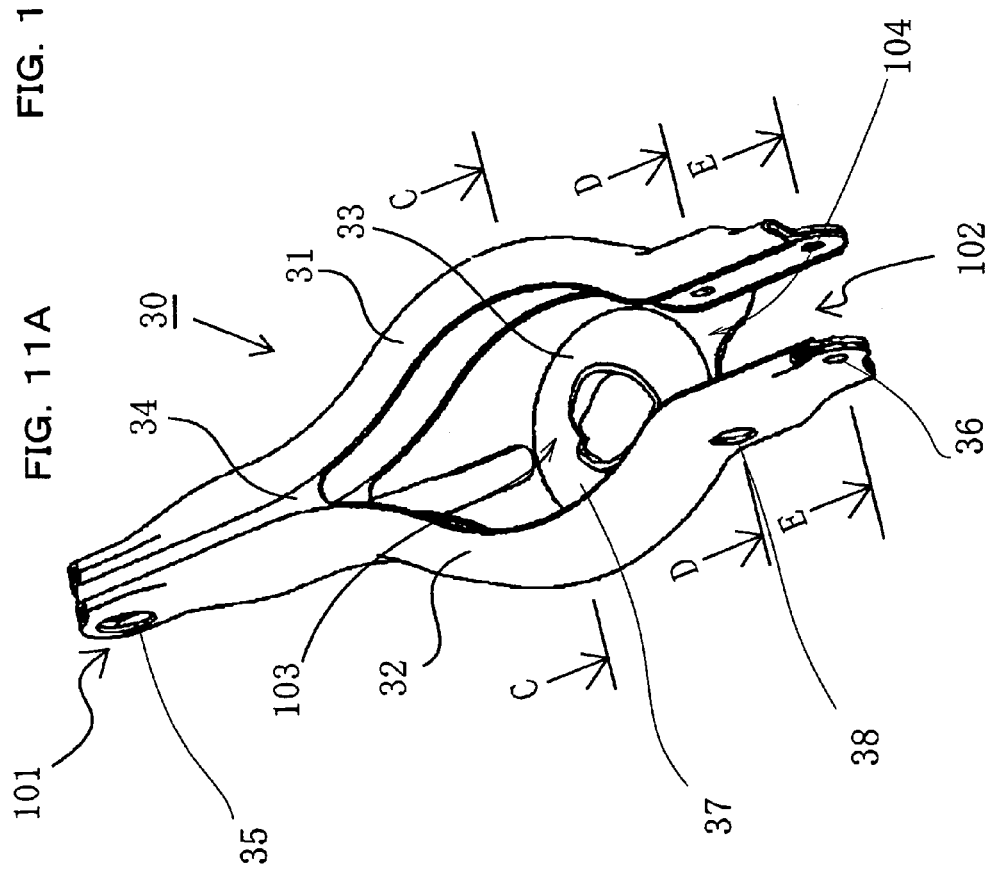
FIG. 11A is a perspective view from the upper side of the suspension arm 30.

FIG. 10 shows a suspension arm 30 according to another embodiment of the invention as another example. FIG. 11A is a perspective view from the upper side of the suspension arm 30, and FIG. 11B is a perspective view from the lower side of the suspension arm 30.

FIG. 12A is a cross-sectional view of the mounting portion 101 for the suspension member 1 (cross-sectional view along the line A-A shown in FIG. 11B), FIG. 12B is a cross-sectional view of a portion which connects the suspension member mounting portion 101 and the mounting portion 103 for the coil spring 3 (cross-sectional view along the line B-B shown in FIG. 11B), FIG. 12C is a cross-sectional view of the coil spring mounting portion 103 (cross-sectional view along the line C-C shown in FIG. 11A), FIG. 12D is a cross-sectional view of the mounting portion 104 for the shock absorber 4 (cross-sectional view along the line D-D shown in FIG. 11A), and FIG. 12E is a cross-sectional view of the mounting portion 102 for the axle carrier 2 (cross-sectional view along the line E-E shown in FIG. 11A). FIGS. 12A to 12E show a state in which the peripheral parts (e.g. coil spring) of the suspension arm 30 are mounted on the suspension arm 30.

Figure 13:
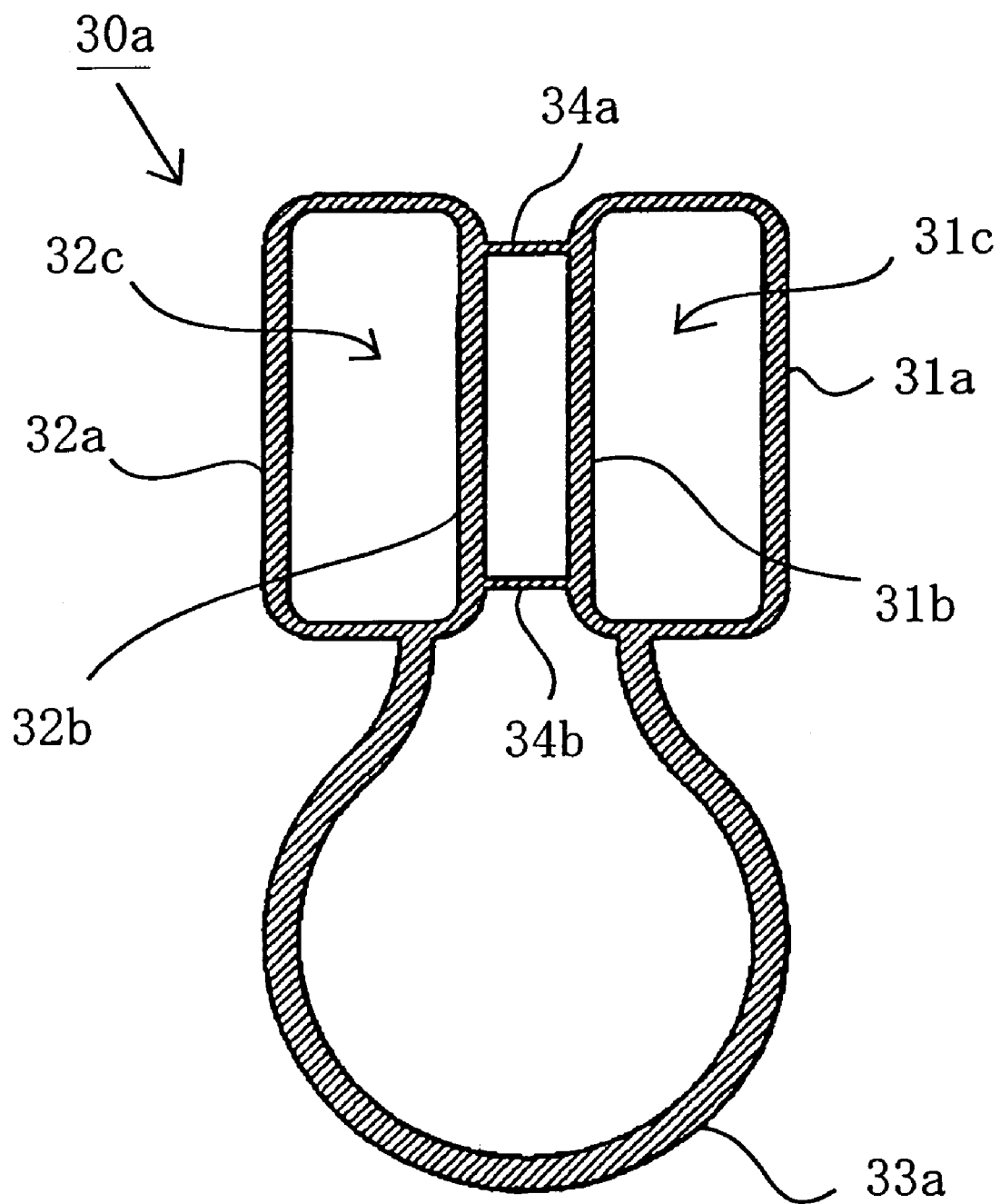
FIG. 13 is a cross-sectional view of an extruded profile used for the suspension arm 30.

FIG. 13 is a cross-sectional view of an extruded profile used for the suspension arm 30.

The suspension arm 30 is produced by plastic working an extruded profile having four closed cross-sectional shapes (left hollow portion, right hollow portion, middle hollow portion, and lower hollow portion) as shown in FIG. 13 produced by using an A 6000 series (Al—Mg—Si) aluminum alloy, for example.

The extruded profile has a cross-sectional shape in which a left hollow portion 32c and a right hollow portion 31c are connected by two horizontal ribs (connection ribs) 34a and 34b and a connection portion 33a.

The example of the suspension arm 30 is an example in which the horizontal ribs 34a and 34b are partially cut and the extruded profile is subjected to predetermined plastic working so that hollow vertical walls 32 and 31 of the product are formed by the left hollow portion 32c and the right hollow portion 31c and a bottom portion 33 of the product is formed by the connection portion 33a.

As shown in FIG. 13, the left hollow portion and the right hollow portion have an approximately rectangular shape having longer vertical sides of which the four corners are in the shape of the letter "R".

The connection portion 33a which forms the bottom portion of the product connects the bottom wall of the left hollow portion and the bottom wall of the right hollow portion and is in the shape of an arc which downwardly projects.

In the extruded profile used in this embodiment, the connection portion 33a has the greatest thickness, and this thickness is gradually decreased in the order of the four vertical walls, the top and bottom walls, and the horizontal ribs.

As shown in FIG. 10, the peripheral parts of the suspension arm 30 have shapes and sizes which differ to a large extent.

Since the mounting portion 101 for the suspension member 1 functions as a pivot, it is preferable that the width of the cross section of the suspension arm 30 be small in the mounting portion 101.

Since the coil spring 3 is in the shape of a helix, the coil spring mounting portion 103 is round and has a large size. Therefore, the cross section of the suspension arm 30 is the greatest in the coil spring mounting portion 103.

In the mounting portion 104 for the shock absorber 4, since the shock absorber is installed inside the cross section, the cross section of the suspension arm must have such a width that the shock absorber can be inserted into the suspension arm.

In the mounting portion 102 for the axle carrier 2, the cross section of the suspension arm must have such a width that the axle carrier 2 can be inserted into the suspension arm in the same manner as the shock absorber mounting portion 104.

As shown in FIGS. 12A to 12E, the suspension arm 10 is formed by plastic working the extruded profile so that the suspension arm 10 has a cross-sectional shape corresponding to each of the mounting portion 101 for the suspension member 1, the mounting portion 102 for the axle carrier 2, the mounting portion 104 for the shock absorber 4, and the mounting portion 103 for the coil spring 3 taking the shape and the size of each peripheral part into consideration.

The inner end of the suspension arm 30 in the direction of the vehicle width forms the suspension member mounting portion 101, and the bushing 1a positioned at the lower end of the suspension member is mounted in a mounting hole 35 in the suspension member mounting portion using a bolt 1b and a nut 1c.

As shown in FIG. 12B, the portion between the suspension member mounting portion 101 and the coil spring mounting portion 103 has a cross section in which the left hollow portion 32 and the right hollow portion 31 adjacent to each other are connected by the horizontal ribs 34a and 34b so that the rigidity and the strength can be sufficiently obtained by the three closed cross-sectional shapes (left hollow portion, middle hollow portion, and right hollow portion).

The weight of this portion is reduced by removing the connection portion 33a of the cross section of the extruded profile shown in FIG. 13.

In FIG. 12B, the removed connection portion is indicated by the broken line.

As shown in FIG. 12A, the connection portion 33a is removed in the suspension member mounting portion 101, and the width is reduced by compressing the left hollow portion and the right hollow portion so that the width is smaller than that of the cross section of the extruded profile shown in FIG. 13.

A bottom surface which supports the lower end of the coil spring 3 is formed in the coil spring mounting portion 103.

As shown in FIG. 12C, in the coil spring mounting portion 103, the left hollow portion and the right hollow portion separated by removing the connection formed by the horizontal ribs are positioned on either side of the coil spring 3. The coil spring mounting portion 103 has a cross section in which the left hollow portion and the right hollow portion are connected by the bottom surface which supports the coil spring 3.

This allows sufficient rigidity and strength to be obtained by the left hollow portion and the right hollow portion, and enables a structure in which the coil spring can be held by the bottom surface.

The bottom surface is formed by spreading the connection portion 33a of the cross section of the extruded profile shown in FIG. 13.

In the shock absorber mounting portion 104, the lower bushing 4a positioned at the lower end of the shock absorber 4 is mounted in a mounting hole 38 in the shock absorber mounting portion 104 using the bolt 4b and the nut 4c.

As shown in FIG. 12D, in the shock absorber mounting portion, the shock absorber is mounted on the inner surfaces 31b and 32b of the left hollow portion and the right hollow portion separated by removing the connection formed by the horizontal ribs.

A bolt and a nut are inserted through holes formed in the outer surfaces 31a and 32a of the left hollow portion and the right hollow portion, and fastened together.

In this portion, the connection portion 33a of the cross section of the extruded profile shown in FIG. 13 is removed in an amount smaller than that in the suspension member mounting portion so that the connection portion 33a partly remains under the bottom walls of the left hollow portion and the right hollow portion.

The inner end of the suspension arm 30 in the direction of the vehicle width forms the axle carrier mounting portion 102. The lower end of the axle carrier 2 is mounted in a mounting hole 36 in the axle carrier mounting portion using a bolt and a nut.

As shown in FIG. 12E, the thickness of the axle carrier mounting portion is substantially secured by separating the left hollow portion and the right hollow portion by removing the connection formed by the horizontal ribs and compressing the left hollow portion and the right hollow portion so that the inner side surface comes in contact with the outer side surface.

Since the mounting hole is formed near the end of the suspension arm 30, the hole may be sheared by tensile force. Therefore, the hole is prevented from being sheared by securing the total thickness of the inner side surface (31b, 32b) and the outer side surface (31a, 32a).

The connection portion 33a of the cross section of the extruded profile shown in FIG. 13 is removed in this portion.

As described above, the shock absorber mounting portion and the coil spring mounting portion are positioned between the suspension member mounting portion and the axle carrier mounting portion, and the left hollow portion and the right hollow portion extend over approximately the entire length of the suspension member mounting portion and the axle carrier mounting portion to form continuous hollow portions.

Since the ends of the left hollow portion and the right hollow portion are compressed, the cross-sectional areas of the left hollow portion and the right hollow portion in the suspension member mounting portion and the axle carrier mounting portion are smaller than the cross-sectional areas of the left hollow portion and the right hollow portion in the coil spring mounting portion.

A process of forming the cross-sectional shape of the extruded profile shown in FIG. 13 into the cross-sectional shape of each portion is described below.

FIGS. 14A to 17 sequentially show a process of forming the suspension arm 30 from the extruded profile.

The dash-dot-dot lines shown in FIGS. 14A to 17 indicate a die and a punch used for processing.

FIG. 14A is a perspective view showing a stage in which the horizontal ribs connecting the left hollow portion and the right hollow portion are removed in the area between the coil spring mounting portion 103 and the axle carrier mounting portion 102 after subjecting the extruded profile having a cross-sectional shape shown in FIG. 13 to a solution treatment, and FIG. 14B is cross-sectional view along the line X-X shown in FIG. 14A.

In this stage, the horizontal ribs are removed so that the middle hollow portion and the lower hollow portion having a closed cross-sectional shape have a partial open cross section. In the portion in which the horizontal ribs are removed, the left hollow portion and the right hollow portion are connected by only the connection portion 33a.

FIG. 15A is a perspective view showing a stage in which the left hollow portion and the right hollow portion are separated in comparison with the stage shown in FIGS. 14A and 14B in the area in which the horizontal ribs are removed, and FIG. 15B is a cross-sectional view along the line X-X shown in FIG. 15A.

The broken line shown in FIG. 15B indicates the shape of the extruded profile before separating the left hollow portion and the right hollow portion. In this stage, the extruded profile is formed by plastic working so that the open width of the open cross section formed by removing the horizontal ribs is partly increased.

As shown in FIG. 15A, the distance between the left hollow portion and the right hollow portion is increased by inserting a columnar die 50 from a position 50s to a position 50e.

As the distance between the left hollow portion and the right hollow portion is increased, the connection portion 33a is deformed while maintaining the circumferential length.

Figure 16:
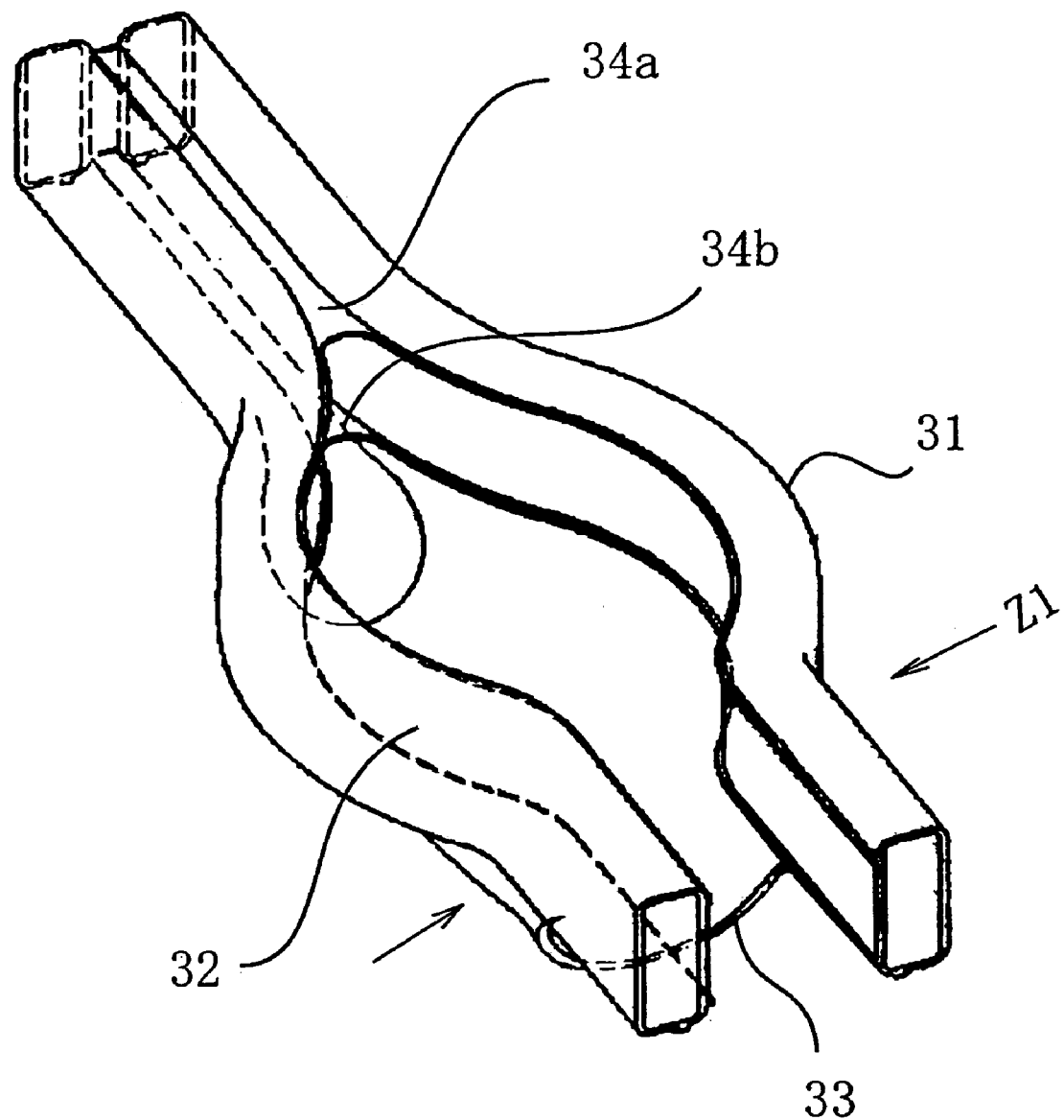
FIG. 16 is a perspective view showing a stage in which the connection portion is removed from the stage shown in FIGS. 15A and 15B in the portions other than the periphery of the coil spring mounting portion, and the left hollow portion and the right hollow portion are bent in the direction indicated by the arrow Z1.

FIG. 16 is a perspective view showing a stage in which the connection portion is removed from the stage shown in FIGS. 15A and 15B in the portions other than the periphery of the coil spring mounting portion, and the left hollow portion and the right hollow portion are bent in the direction indicated by the arrow Z1.

The arrow Z1 is positioned between the shock absorber mounting portion and the coil spring mounting portion. This allows the open width between the left hollow portion and the right hollow portion to be increased in the axle carrier mounting portion 12 and to be further increased in the coil spring mounting portion 14.

Figure 17:
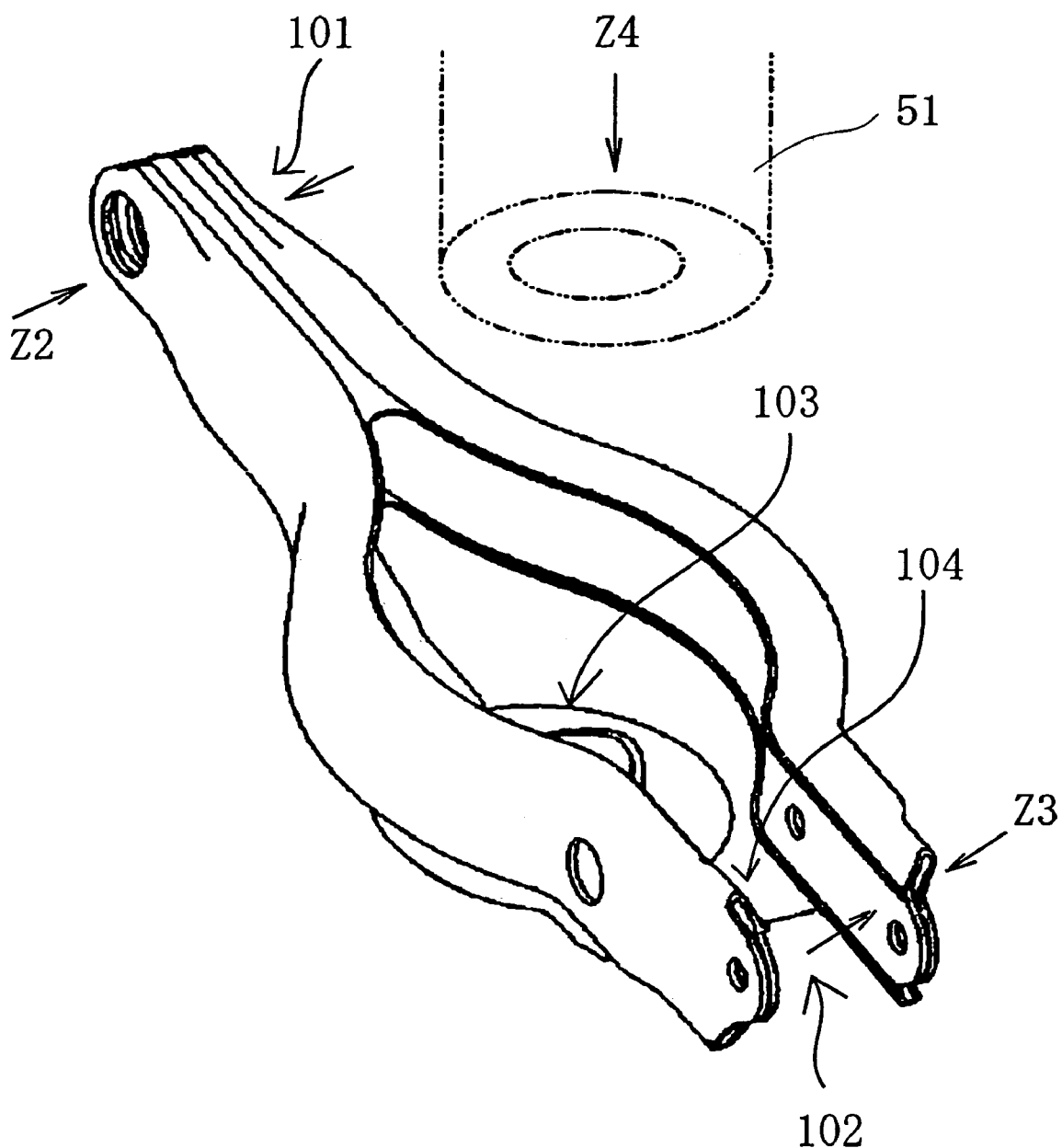
FIG. 17 is an illustration in which the suspension member mounting portion in the stage shown in FIG. 16 is compressed in the direction indicated by the arrow Z2, the axle carrier mounting portion is compressed in the direction indicated by the arrow Z3, and the bottom section is formed by pressing a punch 51 having a shape corresponding to the shape of the coil spring in the direction indicated by the arrow Z4.

FIG. 17 is a perspective view showing the final stage. In the stage shown in FIG. 17, the suspension member mounting portion in the stage shown in FIG. 16 is compressed in the direction indicated by the arrow Z2, the axle carrier mounting portion is compressed in the direction indicated by the arrow Z3, and the bottom portion is formed by pressing a punch 51 having a shape corresponding to the shape of the coil spring in the direction indicated by the arrow. Z4 to obtain the shape of the suspension arm 30.

The hole is then formed in each portion, and the suspension member mounting portion and the axle carrier mounting portion positioned at either end of the suspension arm are cut in the shape of an arc.

Then, the mechanical properties of the material are improved by performing a heat treatment. In the case of a material of which the mechanical properties can be improved without subjecting the extruded profile to a solution heat treatment, the extruded profile may be processed without performing a solution heat treatment, and the mechanical properties may be improved by performing a heat treatment after processing.

As described above, since the suspension arm 30 according to the invention is produced by forming the aluminum alloy extruded profile, and the left hollow portion and the right hollow portion are continuously formed between the suspension member mounting portion and the axle carrier mounting portion, the weight of the suspension arm 30 can be reduced while ensuring sufficient rigidity and strength.

In particular, since both sides of the bottom surface which supports the lower end of the coil spring are reinforced by the left hollow portion and the right hollow portion in the coil spring mounting portion, deflection or deformation occurring when compressive force or tensile force is applied to the suspension arm 30 can be reduced.

As a result, rigidity and strength can be obtained so that control stability can be improved when the vehicle makes a turn.

The processing is facilitated by reducing the number of working steps to obtained the final form, using the cross-sectional shape of the extruded profile which can prevent occurrence of cracks during plastic working, and processing the extruded profile before performing a heat treatment, whereby the manufacturing cost can be reduced.

The material cost can be reduced by changing the thickness of each portion of the cross section of the extruded profile corresponding to the rigidity and the strength.

Since the bottom surface which supports the lower end of the coil spring can be formed at the bottom of the cross section of the arm by removing a part of the horizontal ribs connecting two closed cross-sectional shapes (left hollow portion and right hollow portion) and using the connection portion as the bottom portion of the coil spring mounting portion, the height of the lower end of the coil spring can be decreased to the minimum level.

As a result, the space of the passenger compartment or the luggage compartment can be increased by correspondingly decreasing the height of the upper end of the coil spring, or riding comfort can be improved by increasing the suspension stroke.

Figure 18A:
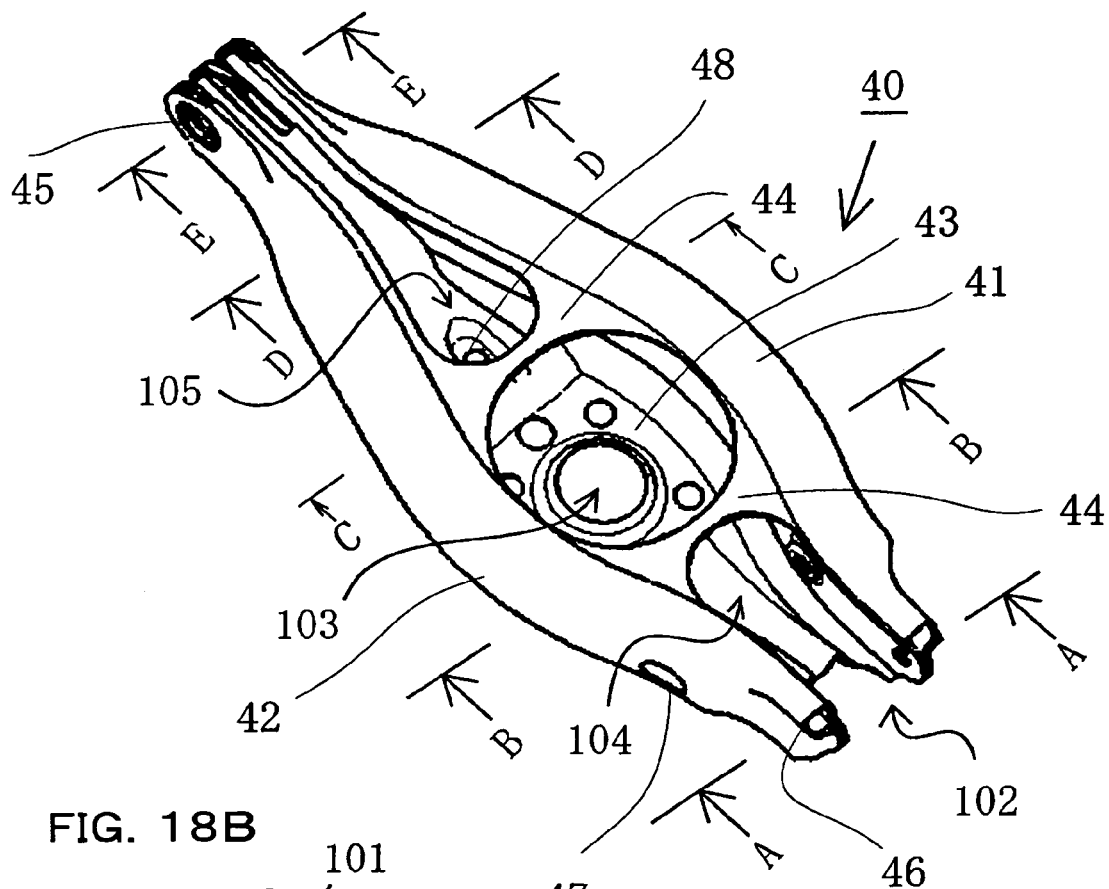
FIG. 18A is a perspective view from the upper side of a suspension arm 40.
Figure 18B:
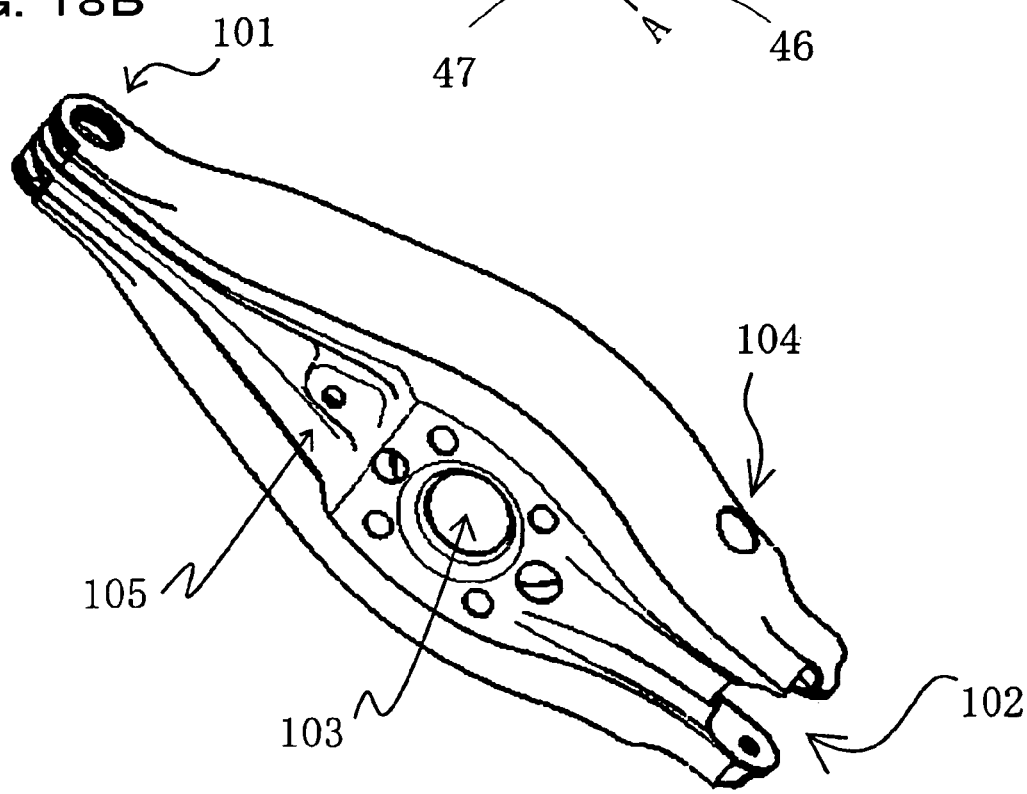
FIG. 18B is a perspective view from the lower side of the suspension arm.

FIGS. 18A and 18B show another embodiment of a vehicular suspension arm according to the invention.

FIG. 18A is a perspective view from the upper side of a suspension arm 40, and FIG. 18B is a perspective view from the lower side of the suspension arm.

Figure 19A:
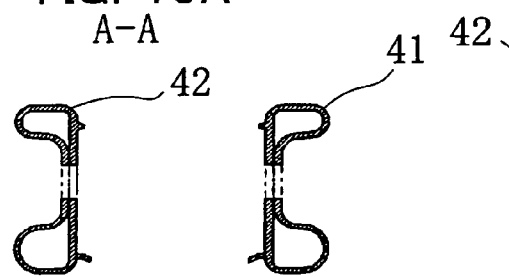
FIG. 19A is a cross-sectional view of the axle carrier mounting portion 102 (cross-sectional view along the line A-A shown in FIG. 18A)
Figure 19B:
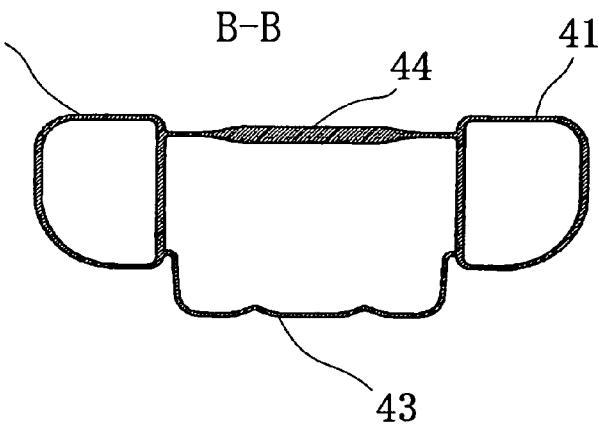
FIG. 19B is a cross-sectional view of a connection wall integrally formed at the upper portion of the vertical walls in the coil spring mounting portion 103 near the outer side in the direction of the vehicle width (cross-sectional view along the line B-B shown in FIG. 18A)
Figure 19C:
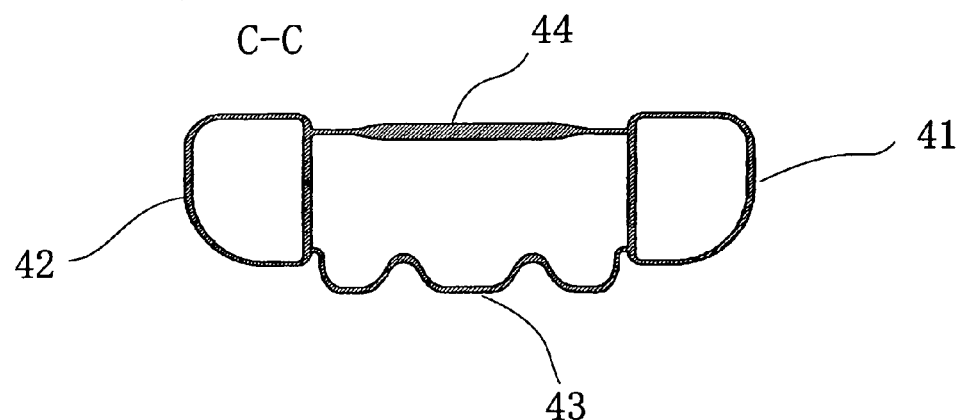
FIG. 19C is a cross-sectional view of a connection wall integrally formed at the upper portion of the vertical walls in the coil spring mounting portion 103 near the inner side in the direction of the vehicle width (cross-sectional view along the line C-C shown in FIG. 18A)
Figure 19D:
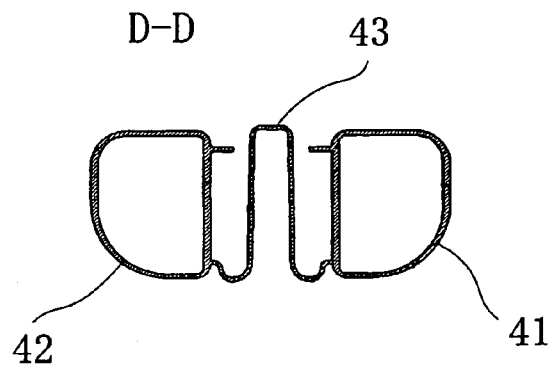
FIG. 19D is a cross-sectional view showing a state in which the bottom of the portion of which the width is partly reduced is formed in a wave shape by plastic working (cross-sectional view along the line D-D shown in FIG. 18A)
Figure 19E:
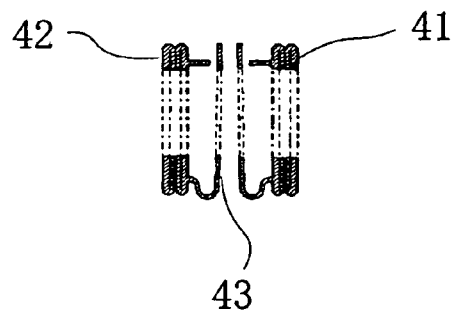
FIG. 19E is a cross-sectional view of the suspension member mounting portion 101 (cross-sectional view along the line E-E shown in FIG. 18).

FIG. 19A is a cross-sectional view of the axle carrier mounting portion 102 (cross-sectional view along the line A-A shown in FIG. 18A), FIG. 19B is a cross-sectional view of a connection wall integrally formed at the upper portion of the vertical walls in the coil spring mounting portion 103 near the outer side in the direction of the vehicle width (cross-sectional view along the line B-B shown in FIG. 18A), FIG. 19C is a cross-sectional view of a connection wall integrally formed at the upper portion of the vertical walls in the coil spring mounting portion 103 near the inner side in the direction of the vehicle width (cross-sectional view along the line C-C shown in FIG. 18A), FIG. 19D is a cross-sectional view showing a state in which the bottom portion of the portion of which the width is partly reduced is formed in a wave shape by plastic working (cross-sectional view along the line D-D shown in FIG. 18A), and FIG. 19E is a cross-sectional view of the suspension member mounting portion 101 (cross-sectional view along the line E-E shown in FIG. 18).

Figure 20A:
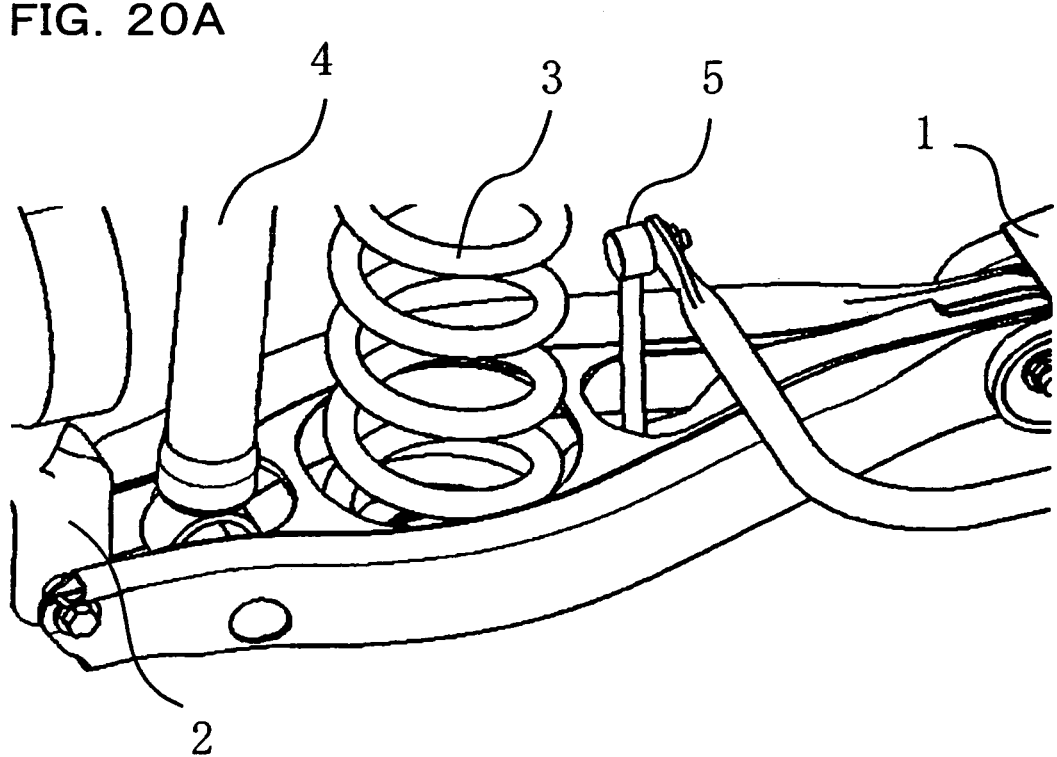
FIG. 20A is a perspective view from the upper side of the suspension mechanism provided with the suspension arm 40.
Figure 20B:
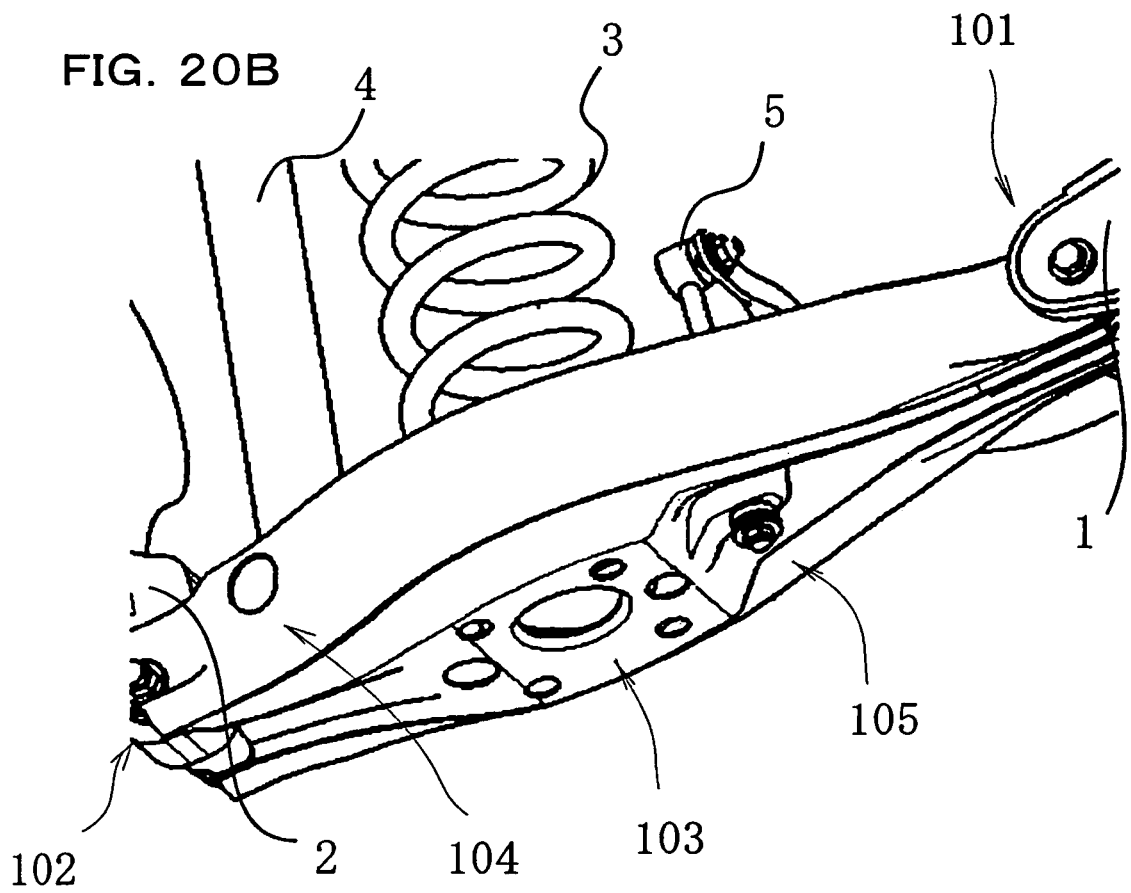
FIG. 20B is a perspective view from the lower side of the suspension mechanism provided with the suspension arm.

FIG. 20A is a perspective view from the upper side of the suspension mechanism provided with the suspension arm 40, and FIG. 20B is a perspective view from the lower side of the suspension mechanism provided with the suspension arm.

Figure 21A:
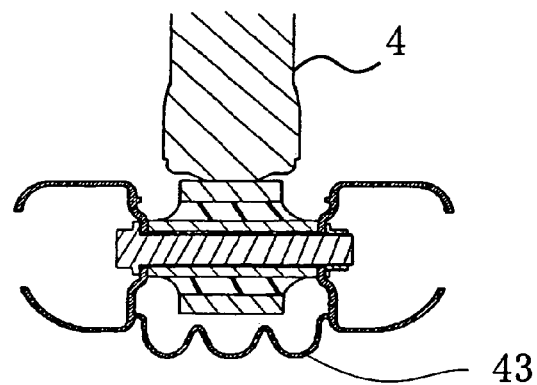
FIG. 21A is a cross-sectional view showing a state in which the shock absorber 4 is assembled with the suspension arm.
Figure 21B:
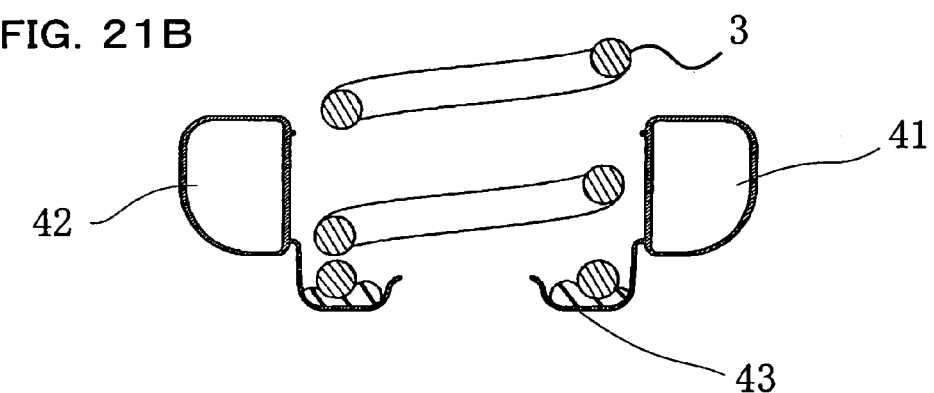
FIG. 21B is a cross-sectional view showing a state in which the coil spring is assembled with the suspension arm.
Figure 21C:
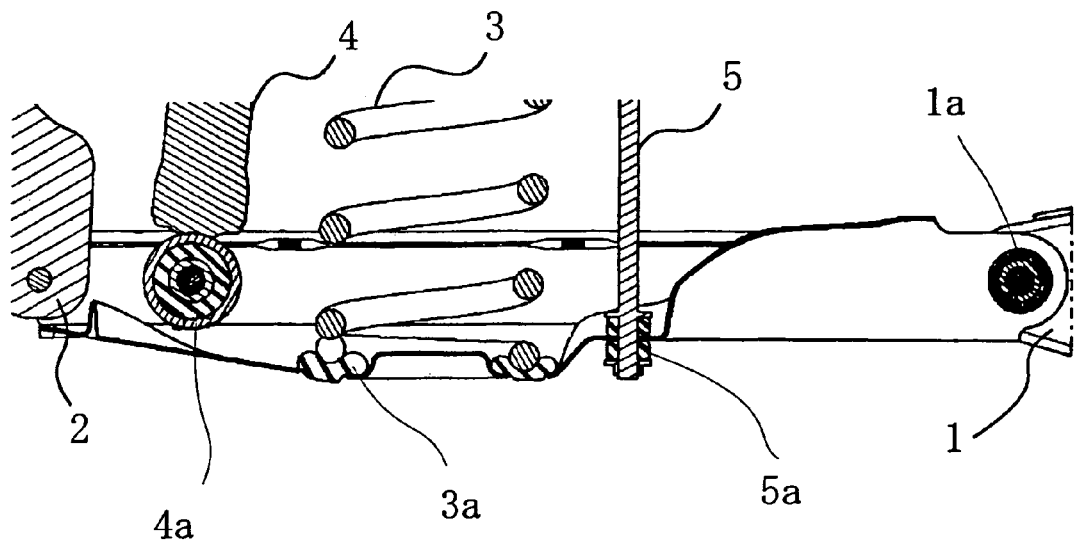
FIG. 21C is a cross-sectional view of the suspension mechanism provided with the suspension arm.

FIG. 21A is a cross-sectional view showing a state in which the shock absorber 4 is assembled with the suspension arm, FIG. 21B is a cross-sectional view showing a state in which the coil spring is assembled with the suspension arm, and FIG. 21C is a cross-sectional view of the suspension mechanism provided with the suspension arm.

Figure 22A:
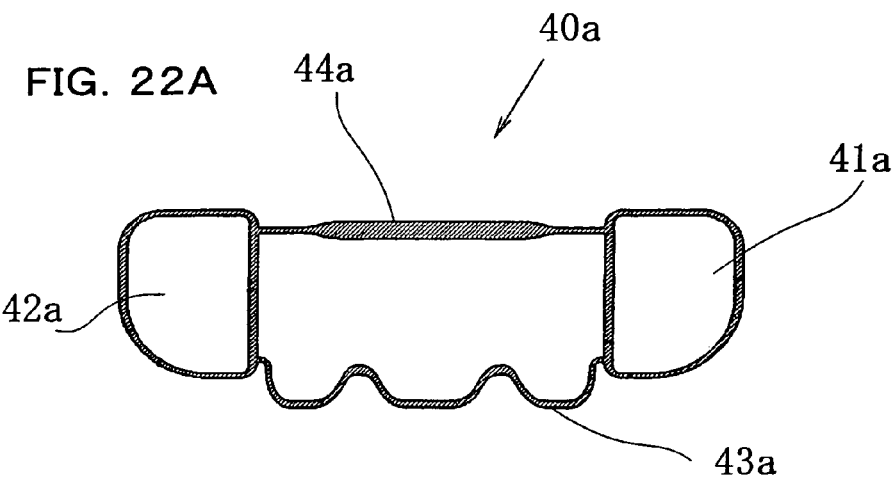
FIG. 22A shows the extruded profile used in one embodiment of the invention in which the center of the horizontal rib has the maximum thickness and the thickness of the horizontal rib is reduced in the areas closer to the left vertical wall and the right vertical wall.

The suspension arm 40 is an example in which the suspension arm is produced by forming an extruded profile having three closed cross-sectional shapes (left hollow portion, right hollow portion, and middle hollow portion) as shown in FIG. 22A produced by using a 6000 series (Al—Mg—Si) aluminum alloy, for example.

A closed cross-sectional shape is formed in which a left vertical wall and a right vertical wall are connected by a horizontal rib 44a and a bottom portion 43a, a left hollow portion 42a is formed on the left of the left vertical wall, and a right hollow portion 41a is formed on the right of the right vertical wall.

The left hollow portion 42a forms a left vertical wall 42 of the product, and the right hollow portion 41a forms a right vertical wall 41 of the product.

The bottom portion 43a forms a bottom 43 of the product.

As shown in FIG. 22A, the extruded profile used in this embodiment is formed so that the center of the horizontal rib has the maximum thickness and the thickness of the horizontal rib is reduced in the area closer to the left vertical wall and the right vertical wall.

The bottom portion is formed in the shape of small waves so that plastic working for the shape of the extruded profile is facilitated.

As shown in FIGS. 20A to 21B, the peripheral parts of the suspension arm 40 have shapes and sizes which differ to a large extent.

Since the suspension member mounting portion 101 functions as a pivot, it is preferable that the width of the cross section of the suspension arm 40 be small in the suspension member mounting portion 101.

Since the coil spring 3 is in the shape of a helix, the coil spring mounting portion 103 is round and has a large size. Therefore, the cross section of the suspension arm is greatest in the coil spring mounting portion 103.

Since the shock absorber in provided inside the cross section in the mounting portion 104 for the shock absorber 4, the cross section of the suspension arm must have such a width that the shock absorber 4 can be inserted into the suspension arm.

In the (mounting portion 102 for the axle carrier 2, the cross section of the suspension arm must have such a width that the axle carrier 2 can be inserted into the suspension arm in the same manner as the shock absorber 4.

A sufficient open space must be provided above the mounting portion 105 for the stabilizer link 5 so that the stabilizer link which moves does not interfere with the suspension arm 40.

The cross-sectional shape of the suspension arm must be made to conform to the suspension member mounting portion, the axle carrier mounting portion, the shock absorber mounting portion, the coil spring mounting portion, and the cross-sectional shape in the open space above the stabilizer link mounting portion by plastic working the extruded profile as shown in FIGS. 19A to 19E, 21A and 21B, taking the shape and size of each peripheral part into consideration.

The inner end of the suspension arm in the direction of the vehicle width forms the suspension member mounting portion 101, and is secured to the suspension member's mounting portion using a bolt and nut after press fitting the bushing 1a into a mounting hole 45 in the suspension member.

As shown in FIG. 19E, the suspension member mounting portion 101 of the suspension arm 40 is subjected to plastic working so as to reduce the open width of the open cross section portion (i.e. portion in which a part of the horizontal rib (connection rib) is removed) of the closed cross-sectional shape (middle hollow portion) formed by the horizontal rib and the bottom portion of the extruded profile.

In this portion, the bottom portion is bent in a wave shape by plastic working.

The suspension member mounting portion 101 is formed by completely compressing the left hollow portion and the right hollow portion while maintaining the width between the left vertical wall and the right vertical wall.

As shown in FIG. 19D, the portion between the suspension member mounting portion 101 and the stabilizer link 105 is subjected to plastic working so as to reduce the open width of the open cross section portion (i.e. portion in which a part of the horizontal rib is removed) of the closed cross-sectional shape (middle hollow portion) formed by the horizontal rib and the bottom portion of the extruded profile.

In this portion, the bottom portion is bent in a wave shape by plastic working.

The rigidity and strength of the horizontal wall of the bottom can be improved by forming the bottom in a wave shape so that deflection and deformation can be reduced.

In the stabilizer link mounting portion 105, the bottom surface which supports the lower end of the stabilizer link 5 is formed by the bottom portion.

As shown in FIG. 21C, the extruded profile is subjected to plastic working so as to reduce the open width of the open cross section portion (i.e. portion in which a part of the horizontal rib is removed) of the closed cross-sectional shape (middle hollow portion) formed by the horizontal rib and the bottom portion of the extruded profile.

In this portion, the bottom portion is formed in a wave shape by plastic working.

The stabilizer link 5 is mounted in a mounting hole 48 formed in the bottom portion through the bushing 5a using a nut.

A sufficient open space is obtained above the stabilizer link mounting portion by removing the horizontal rib so that the stabilizer link which moves does not interfere with the suspension arm.

As shown in FIGS. 19B and 21C, in the portion near the coil spring mounting portion 103 on the inner side in the direction of the vehicle width, the closed cross-sectional shape (middle hollow portion) is formed by the horizontal rib and the bottom portion connected with the left vertical wall and the right vertical wall of the extruded profile.

The center of the horizontal rib has the maximum thickness and the thickness of the horizontal rib is reduced in the area closer to the left vertical wall and the right vertical wall so that the stress is made uniform and an unnecessarily thick portion is eliminated.

In particular, since the horizontal rib prevents the cross section of the coil spring mounting portion from being increased in the horizontal direction, deflection and deformation can be reduced.

In the coil spring mounting portion 103, the bottom surface which supports the lower end of the coil spring 3 is formed by the bottom portion.

As shown in FIGS. 21B and 21C, the coil spring mounting portion 103 is formed by subjecting the horizontal wall of the bottom surface to plastic working to give a bottom surface shape which the coil spring mounting portion supports by inserting a die from the opening in the open cross section in which the horizontal rib is removed from the closed cross-sectional shape (middle hollow portion) formed by the horizontal rib and the bottom portion of the extruded profile, and the coil spring can be held by the bottom surface through an insulator.

The coil spring mounting portion 103 is reinforced by forming the left hollow portion on the left of the left vertical wall and forming the right hollow portion on the right of the right vertical wall, so that a small amount of deflection or deformation of the vertical wall is reduced.

As shown in FIGS. 19B and 21C, in the portion near the coil spring mounting portion on the outer side in the direction of the vehicle width, the closed cross-sectional shape (middle hollow portion) is formed by the horizontal rib and the bottom portion connected with the left vertical wall and the right vertical wall of the extruded profile.

The horizontal rib prevents the cross section of the coil spring mounting portion from being increased in the horizontal direction.

In the shock absorber mounting portion 104, the lower bushing 4a which is a part of the shock absorber 4 is mounted in a mounting hole 47 in the shock absorber mounting portion using a bolt and a nut.

The bolt and the nut are inserted through holes formed in the outer walls of the left hollow portion on the left of the left vertical wall and the right hollow portion on the right of the right vertical wall, and fastened together.

As shown in FIGS. 21A and 21C, the shock absorber mounting portion 104 is subjected to plastic working so that the open width between the vertical walls of the extruded profile is reduced.

The rigidity and strength of the horizontal wall of the bottom are improved by forming the bottom portion in a wave shape when reducing the open width, so that deflection and deformation can be reduced.

The outer end of the suspension arm 40 in the direction of the vehicle width forms the axle carrier mounting portion 102. The lower end of the axle carrier 2 is mounted in a mounting hole 14 in the axle carrier mounting portion using a bolt and a nut.

As shown in FIGS. 19A and 21C, the axle carrier mounting portion is subjected to plastic working so as to reduce the open width of the open cross section portion in which a part of the horizontal rib and the bottom portion of the extruded profile are removed. The axle carrier mounting portion 102 is formed by completely compressing a part of the left hollow portion and the right hollow portion while maintaining the width between the left vertical wall and the right vertical wall.

In the portion in which the mounting hole 46 is formed, since the thickness of the outer surface of the left hollow portion or the right hollow portion is added to the thickness of the left vertical wall or the right vertical wall by completely compressing a part of the left hollow portion and the right hollow portion, one wall substantially has a thickness corresponding to the thickness of two walls, so that the hole is prevented from being sheared.

As described above, the shock absorber mounting portion and the coil spring mounting portion are positioned between the suspension member mounting portion and the axle carrier mounting portion, and the left hollow portion and the right hollow portion extend over approximately the entire length of the suspension member mounting portion and the axle carrier mounting portion to form continuous hollow portions. Since the ends of the left hollow portion and the right hollow portion are compressed, the cross-sectional areas of the left hollow portion and the right hollow portion in the suspension member mounting portion and the axle carrier mounting portion are smaller than the cross-sectional areas of the left hollow portion and the right hollow portion in the coil spring mounting portion.

A process of forming the cross-sectional shape of the extruded profile shown in FIG. 22A into the cross-sectional shape of each portion is described below.

Figure 22B:
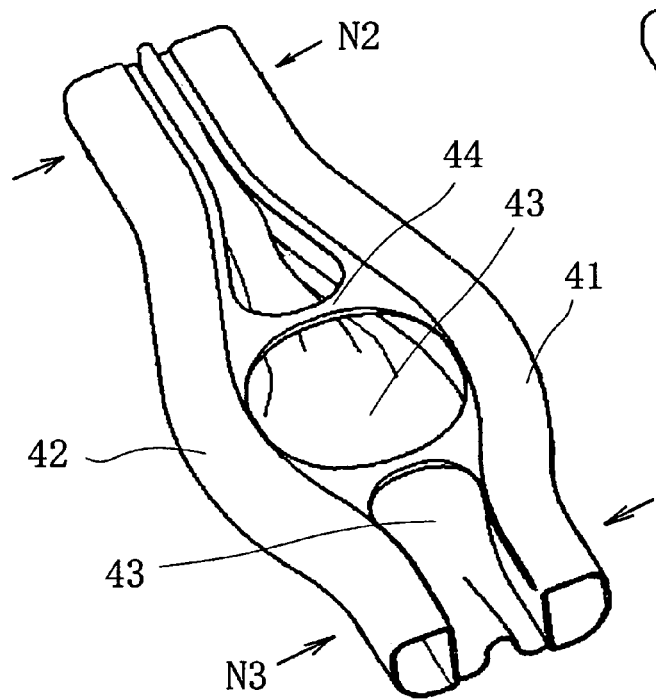
FIG. 22B is a perspective view from above the outer side in the direction of the vehicle width showing a step of plastic working the suspension arm.
Figure 22C:
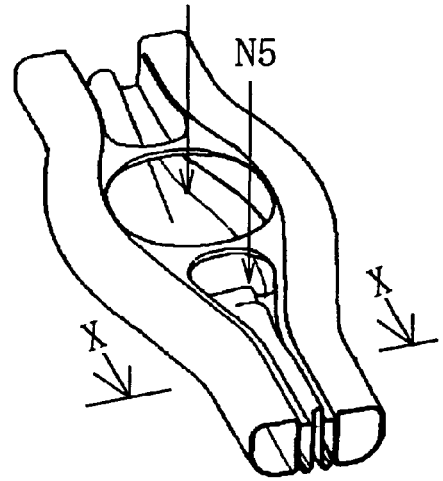
FIG. 22C is a perspective view from above the inner side in the direction of the vehicle width showing a step of plastic working the suspension arm.
Figure 22D:
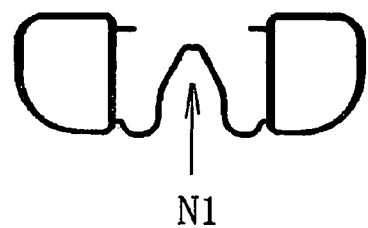
FIG. 22D is a cross-sectional view showing a step in which the portion of which the width is partly reduced is subjected to plastic working in a wave shape (cross section along the line X-X shown in FIG. 22B).

FIGS. 22B to 22D show the process of forming the suspension arm 40 from the extruded profile.

FIG. 22B is a perspective view from above the outer side in the direction of the vehicle width showing a step of plastic working the suspension arm, FIG. 22C is a perspective view from above the inner side in the direction of the vehicle width showing a step of plastic working the suspension arm, and FIG. 22D is a cross-sectional view showing a step in which the portion of which the width is partly reduced is subjected to plastic working in a wave shape (cross section along the line X-X shown in FIG. 22B).

The extruded profile having a cross-sectional shape shown in FIG. 22A is subjected to a solution heat treatment. The horizontal rib 43a (43) is removed in the portion shown in FIG. 22B excluding the upper portions of the vertical walls near the coil spring mounting portion on the inner side and the outer side in the direction of the vehicle width. As shown in FIG. 22D, the horizontal wall of the bottom surface is bent toward the inside of the cross section in a wave shape in the direction N1.

Then, the width of the opening is reduced by compressing the portion shown in FIG. 22B in the directions N2 and N3.

In this case, the wave-shaped bottom portion is further plastically deformed.

In order to form the coil spring mounting portion 103 and the stabilizer link mounting portion 105, dies are inserted in the directions N4 and N5 to effect plastic working.

Then, the left hollow portion and the right hollow portion are compressed in the suspension member mounting portion and the axle carrier mounting portion to form a final shape, and punching and trimming of each section are performed.

Then, the mechanical properties of the material are improved by performing a heat treatment.

In the case of a material of which the mechanical properties can be improved without subjecting the extruded profile to a solution heat treatment, the extruded profile may be processed without performing a solution heat treatment, and the mechanical properties may be improved by performing a heat treatment after processing.

As described above, since the suspension arm according to the invention is produced by forming the aluminum alloy extruded profile, and the cross section of the coil spring mounting portion is prevented from being increased in the horizontal direction by the connection rib (horizontal rib) integrally formed from the aluminum alloy extruded profile, deflection and deformation can be reduced.

Since the suspension arm includes the integrally formed connection rib, the weight of the suspension arm can be inexpensively reduced while ensuring sufficient rigidity and strength.

Since the connection rib is integrally formed of the extruded profile, the thickness of the connection rib can be arbitrarily changed in each portion. Therefore, stress applied to the connection rib when compressive force or tensile force is applied to the suspension arm can be made uniform by changing the thickness of the connection rib, so that the weight of the suspension arm can be further reduced by eliminating an unnecessarily thick portion.

The shape of the support portion of the shock absorber or the coil spring, the shape of the suspension member mounting portion, and the shape of the axle carrier mounting portion can be set at optimum dimensions corresponding to respective required performance by removing a part of the closed cross-sectional shape to form an open cross section and subjecting the extruded profile to plastic working so that the open width of the open cross section is partly reduced. This makes it possible to make a fine adjustment for reducing noise and vibration, whereby riding comfort can be further improved.

The bottom portion in the portion which is partly reduced is formed in a wave shape by plastic working and absorbs the difference in size of the bottom portion which occurs when the bottom portion of the extruded profile having a size sufficient to accommodate the coil spring is partly reduced, so that plastic working is facilitated.

The rigidity and strength of the horizontal wall of the bottom can be improved by forming the bottom in a wave shape so that deflection and deformation can be reduced. Specifically, the weight of the suspension arm is further reduced while maintaining the rigidity and strength of the suspension arm.

The die insertion path can be secured when plastic working the bottom portion by removing a part of the connection rib (horizontal rib) in the area near the coil spring mounting portion on the inner side and the outer side in the direction of the vehicle width to form the bottom portion as the coil spring mounting portion, so that plastic working is facilitated.

Since plastic working is facilitated, cost can be further reduced.

Since a small amount of deflection occurring in the portion having the total length of the suspension arm can be prevented by providing two closed cross-sectional shapes on the right and left of the coil spring and allowing the left hollow portion and the right hollow portion having a closed cross section to extend over approximately the total length between the suspension member mounting portion and the axle carrier mounting portion to form continuous hollow portions, sufficient rigidity and strength can be ensured even if the thickness of the vertical wall is reduced, so that the weight of the suspension arm can be reduced.

In particular, since the vertical walls connected with the ends of the bottom surface which supports the lower end of the coil spring are reinforced by the left hollow portion and the right hollow portion in the coil spring mounting portion, a minute deflection or deformation of the vertical walls can be reduced.

Therefore, occurrence of deflection and deformation can be reduced when compressive force or tensile force is applied to the suspension arm. As a result, the control stability when the vehicle makes a turn can be improved by ensuring rigidity and strength. Moreover, processing is facilitated by reducing the number of working steps to obtain the final form, using the cross-sectional shape of the extruded profile which can prevent occurrence of cracks during plastic working, and processing the extruded profile before performing a heat treatment, whereby the manufacturing cost can be reduced.

Figure 23A:
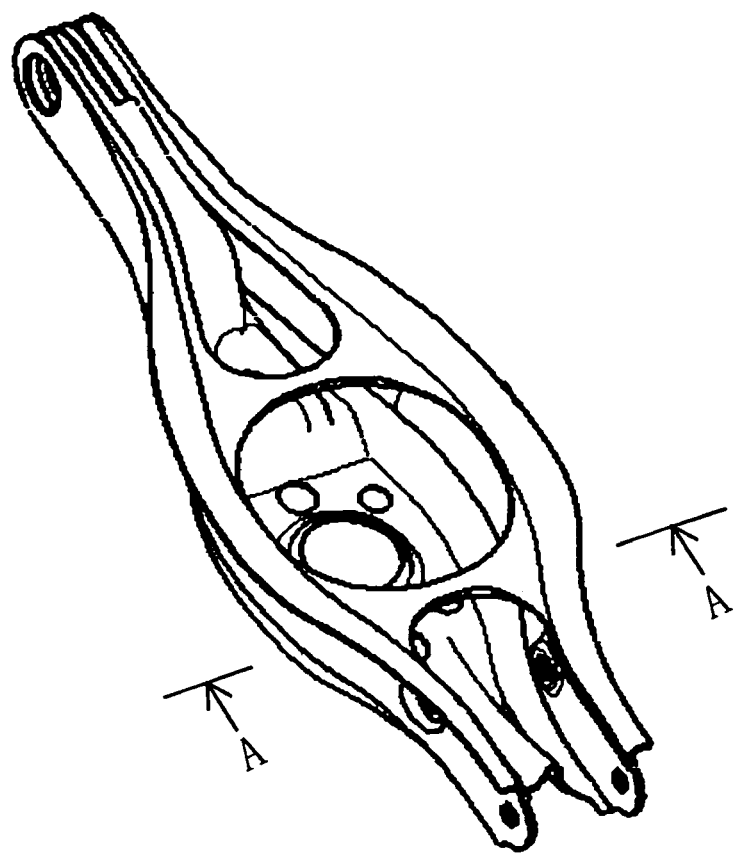
FIG. 23A shows another embodiment.
Figure 23B:
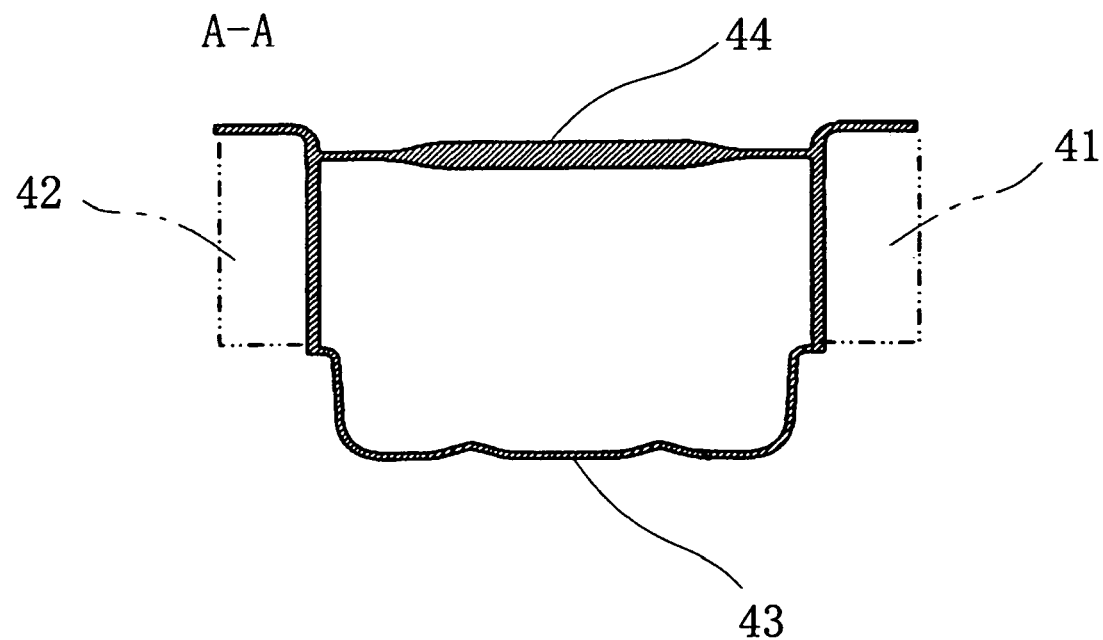
FIG. 23B shows a cross sectional along the line A-A shown in FIG. 23A.
Figure 24:
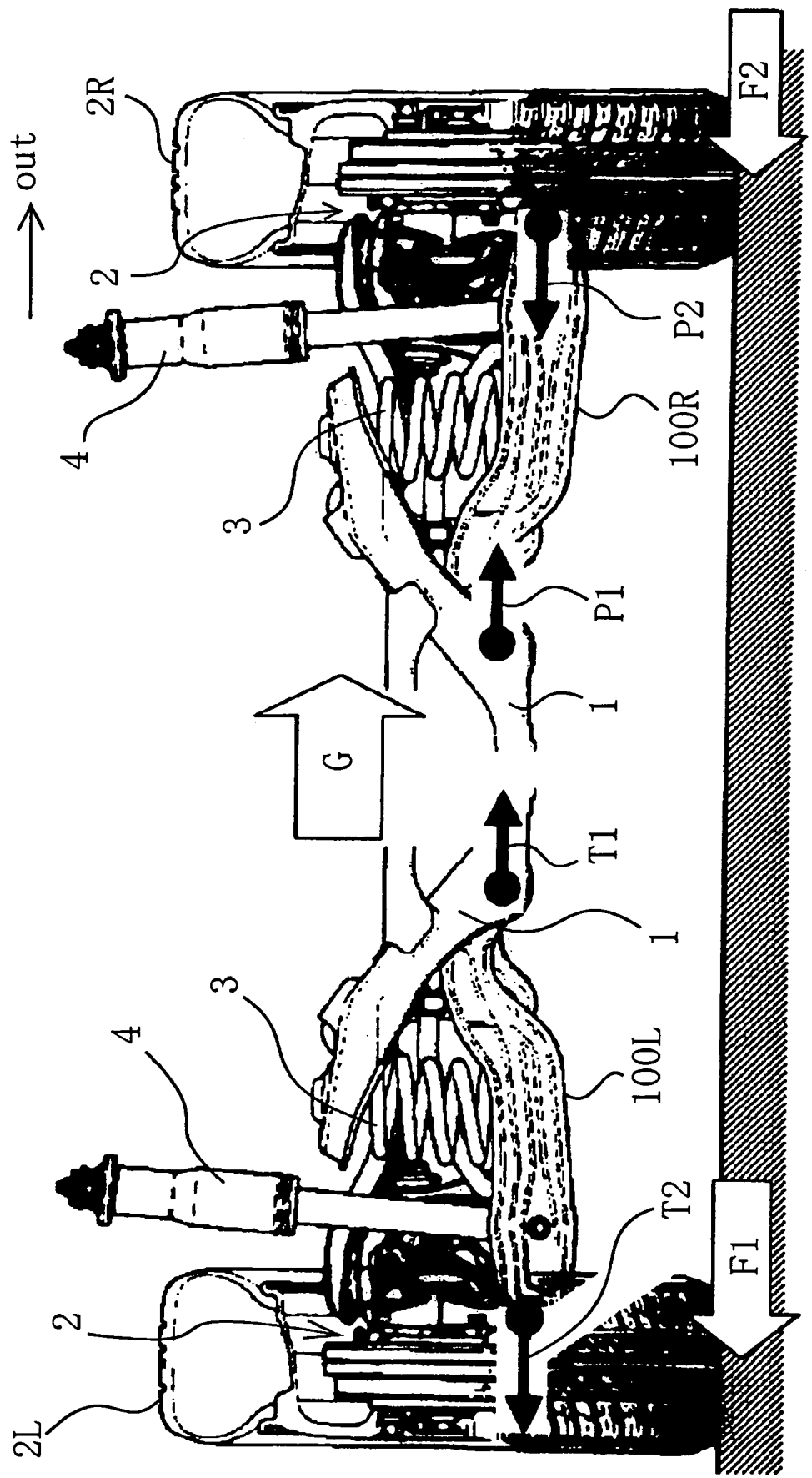
FIG. 24 shows a centrifugal force G acting to the right in the direction of the vehicle width when a vehicle turns left.

FIG. 23A shows an application example. FIG. 23B shows a cross section along the line A-A shown in FIG. 23A. This portion has a shape almost the same as the shape of the extruded profile used. This application example has a structure similar to the above-described configuration except for removing the hollow portions (left hollow portion and right hollow portion) having a closed cross-sectional shape provided on the right and left of the coil spring and continuously extending over approximately the total length of the suspension member mounting portion and the axle carrier mounting portion.

This application example may be applied to a product which can satisfy required performance such as that relating to deflection without the hollow portions having a closed cross-sectional shape provided on the right and left of the coil spring and continuously extending over approximately the total length of the suspension member mounting portion and the axle carrier mounting portion.

According to the invention, the thicknesses of the vertical wall and the bottom portion can be optimized by using a light aluminum alloy extruded profile, whereby the lower end of the suspension component can be supported at a reduced height.

Since the connection rib integrally formed from the extruded profile prevents the cross section of the coil spring mounting portion from being increased in the horizontal direction, deflection and deformation can be reduced. Since the suspension arm includes the integrally formed connection rib, high rigidity and strength can be obtained, and the weight of the suspension arm can be reduced by significantly reducing the amount of material used. Moreover, since an optimum cross-sectional shape can be set for each mounting portion, and the thickness distribution is adjusted so that equal stress is applied to each portion when compressive force or tensile force is applied to the suspension arm, the weight of the suspension arm can be further reduced.

Since the invention has the above-described features, the invention is effectively applied to a vehicular suspension arm. The invention may also be applied to various arms which are required to rigidly support a component.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An arm member comprising:
   a bottom portion made of an aluminum alloy extruded profile;
   at least two vertical walls made of an aluminum alloy extruded profile and each having a hollow cross-sectional shape;
   a horizontal rib which connects the two vertical walls;
   an opening formed by widening an interval between the two vertical walls at a position where a part of the horizontal rib is removed between the two vertical walls and having a width which is larger than an outer diameter of an insertion portion of an insertion component;
   connection portions respectively provided on the vertical walls at ends of the arm member; and
   a component lower end support portion which is provided at a position opposed to the opening and provided between the two vertical walls or at the bottom portion, and supports a lower end of the insertion component inserted through the opening.

2. A suspension arm comprising:
   a bottom portion made of an aluminum alloy extruded profile;
   at least two vertical walls made of an aluminum alloy extruded profile and each having a bottom end which is connected to the bottom portion and a free top end;
   a horizontal rib which connects the two vertical walls at a middle position between the bottom end and the free top end;
   an opening formed by removin a art of the horizontal rib between the two vertical walls;
   a suspension member mounting portion provided on one of the two vertical walls at one end of the arm member;
   an axle carrier mounting portion provided on the other of the two vertical walls at the other end of the arm member; and
   a suspension component lower end support portion which is provided at a position opposed to the opening and provided between the two vertical walls or at the bottom portion, and supports a lower end of a suspension component which is at least one of a coil spring, a shock absorber, and a stabilizer connection member.

3. The suspension arm according to claim 2, wherein the suspension component lower end support portion is formed by changing an interval formed by removing a part of the horizontal rib between the two vertical walls.

4. The suspension arm according to claim 2, wherein the two vertical walls made of the extruded profile has a hollow cross-sectional shape.

5. The suspension arm according to claim 4, wherein the suspension member mounting portion and/or the axle carrier mounting portion is formed by partially compressing a hollow portion of the two vertical walls.

6. The suspension arm according to claim 2, wherein a part of the bottom portion is formed in a wavy and compressed shape.

* * * * *

UNITED STATES PATENT AND TRADEMARK OFFICE
CERTIFICATE OF CORRECTION

PATENT NO. : 7,261,307 B2
APPLICATION NO. : 11/324788
DATED : August 28, 2007
INVENTOR(S) : Kazunobu Nuno et al.

It is certified that error appears in the above-identified patent and that said Letters Patent is hereby corrected as shown below:

TITLE PAGE, FOREIGN PATENT DOCUMENTS, line 10, delete "WO WO 01/32979 5/2001" (duplicate entry)

Column 1, Line 4, "APPLICATION" should be --APPLICATIONS--

Column 5, Line 52, "a" should be --an-- (3rd occurrence)

Column 6, Line 43, after "is" insert --a--

Column 6, Line 49, after "is" insert --a--

Column 7, Line 46, after "sectional" insert --view--

Column 7, Line 55, "OT" should be --OF--

Column 8, Line 5, "a" should be --an-- (2nd occurrence)

Column 14, Line 24, after "is" insert --a--

Column 15, Line 3, "arrow." should be --arrow--

Column 15, Line 34, "obtained" should be --obtain--

Column 16, Line 59, "in" should be --is--

UNITED STATES PATENT AND TRADEMARK OFFICE
CERTIFICATE OF CORRECTION

PATENT NO. : 7,261,307 B2
APPLICATION NO. : 11/324788
DATED : August 28, 2007
INVENTOR(S) : Kazunobu Nuno et al.

It is certified that error appears in the above-identified patent and that said Letters Patent is hereby corrected as shown below:

Column 22, Line 31, Claim 2, "removin a art" should be --removing a part--

Signed and Sealed this

Twenty-fourth Day of June, 2008

JON W. DUDAS
*Director of the United States Patent and Trademark Office*